United States Patent [19]
Wegerich et al.

[11] Patent Number: 5,987,399
[45] Date of Patent: Nov. 16, 1999

[54] ULTRASENSITIVE SURVEILLANCE OF SENSORS AND PROCESSES

[75] Inventors: Stephan W. Wegerich, Glendale Heights, Ill.; Kristin K. Jarman, Richland, Wash.; Kenneth C. Gross, Bolingbrook, Ill.

[73] Assignee: ARCH Development Corporation, Argonne, Ill.

[21] Appl. No.: 09/006,713

[22] Filed: Jan. 14, 1998

[51] Int. Cl.$^6$ .................................................. G21C 7/00
[52] U.S. Cl. ........................ 702/183; 702/179; 702/185; 376/216; 376/217
[58] Field of Search ............................ 702/179, 181–183, 702/116, 185; 376/215, 216, 217; 340/517, 525

[56] References Cited

U.S. PATENT DOCUMENTS

| | | | |
|---|---|---|---|
| 4,803,040 | 2/1989 | Gross et al. | 376/216 |
| 5,223,207 | 6/1993 | Gross et al. | 702/116 |
| 5,410,492 | 4/1995 | Gross et al. | 702/185 |
| 5,459,675 | 10/1995 | Gross et al. | 702/183 |
| 5,586,066 | 12/1996 | White et al. | 702/181 |
| 5,629,872 | 5/1997 | Gross et al. | 702/179 |
| 5,761,090 | 6/1998 | Gross et al. | 706/906 |

OTHER PUBLICATIONS

Gross, K.C. & K.E. Humenik (1989) *Nuclear Plant Component Surveillance Implemented in SAS Software*, SAS Users' Group International Conference, Apr. 9–12, 1989 San Francisco, CA, pp. 1127–1131.
Gross, K.C., K.E. Humenik & L. Braun (1989) *Reactor Coolant Pump Surveillance Using Sequential Probability Ratio Tests*, Trans. Amer. Nuc. Soc. vol. 60, pp. 438–440.
Gross, K.C. & K.E. Humenik (1989) *Sequential Probability Ratio Test for Nuclear Plant Component Surveillance*, Nuclear Technology, vol. 93, pp. 131–137.
Gross, K.C., R.M. Singer, K.E. Humenik and M. Walsh (1990) *Expert System for Reactor Coolant Pump Surveillance*, Int'l Fast Reactor Safety Meeting, Aug. 12–16, 1990 Snowbird, Utah.
Humenik, K. & K.C. Gross (1990) *Sequential Probability Ratio Tests for Reactor Signal Validation and Sensor Surveillance Applications*, Nuc. Sci. & Engineering, vol. 105, pp. 383–390.
Singer, R.M., K.C. Gross, K.E. Humenik & M. Walsh (1900) *Reactor Coolant Pump Monitoring and Diagnostic System*, Proc. of the 2nd Int'l Machinery Monitoring & Diagnostic Conf. L.A., CA. pp. 19–24.
Gross, K.C. & R.M. Singer (1991) *Automated Surveillance of Reactor Coolant Pump Performance*, 4th Int'l Workshop on Main Coolant Pumps, Apr. 16–19, 1991 Phoenix, AZ.
Singer, R.M., K.C. Gross & K.E. Humneik (1991) *Pumping System Fault Detection and Diagnosis Utilizing Pattern Recognition and Fuzzy Inference Techniques*, 4th Int'l Conf. on Indust. & Eng. Apps. of AI & Expert Systems, Kauai, HA, vol. I, pp. 51–61.
Gross, K.C. & K.K. Hoyer (1992) *Spectrum–Transformed Sequential Testing Method for Signal Validation Applications*, 8th Power Plant Dynamics, Control & Testing Symp. May 27–29, 1992 Knoxville, TN.
Humenik, K. & K.C. Gross (1992) *Using Fourier Series Methods to Reduce Correlation of Nuclear Power Reactor Data*, Nuc. Sci. & Engineering: 112, pp. 127–135.

*Primary Examiner*—John Barlow
*Assistant Examiner*—Bryan Bui
*Attorney, Agent, or Firm*—Michael D. Rechtin; Foley & Lardner

[57] ABSTRACT

A method and apparatus for monitoring a source of data for determining an operating state of a working system. The method includes determining a sensor (or source of data) arrangement associated with monitoring the source of data for a system, activating a method for performing a sequential probability ratio test if the data source includes a single data (sensor) source, activating a second method for performing a regression sequential possibility ratio testing procedure if the arrangement includes a pair of sensors (data sources) with signals which are linearly or non-linearly related; activating a third method for performing a bounded angle ratio test procedure if the sensor arrangement includes multiple sensors and utilizing at least one of the first, second and third methods to accumulate sensor signals and determining the operating state of the system.

12 Claims, 31 Drawing Sheets

$\alpha = 0.0001, \beta = 0.0001, SFM = 2.5$ $\alpha = 0.0001, \beta = 0.0001, \text{SFM} = 2.5$

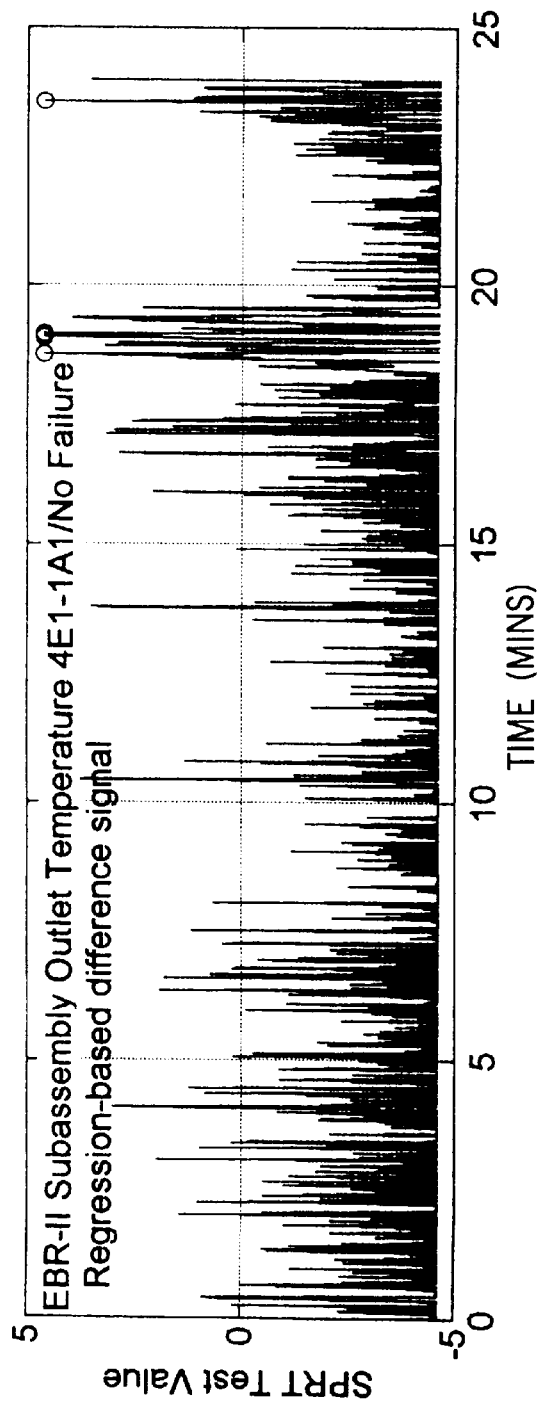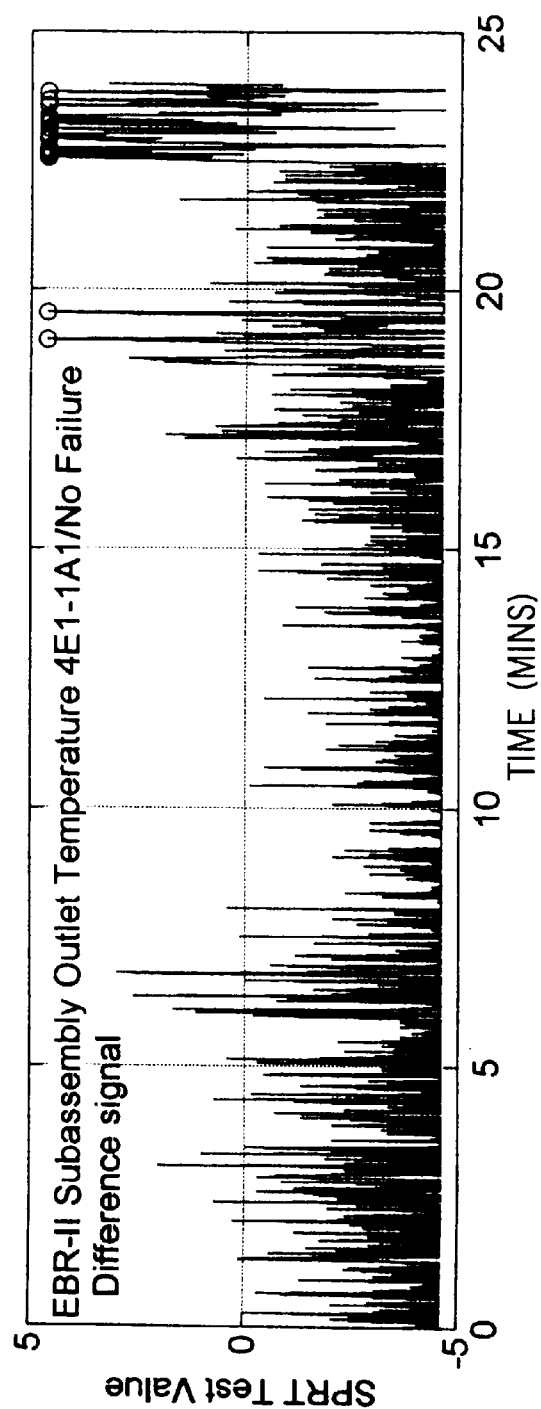

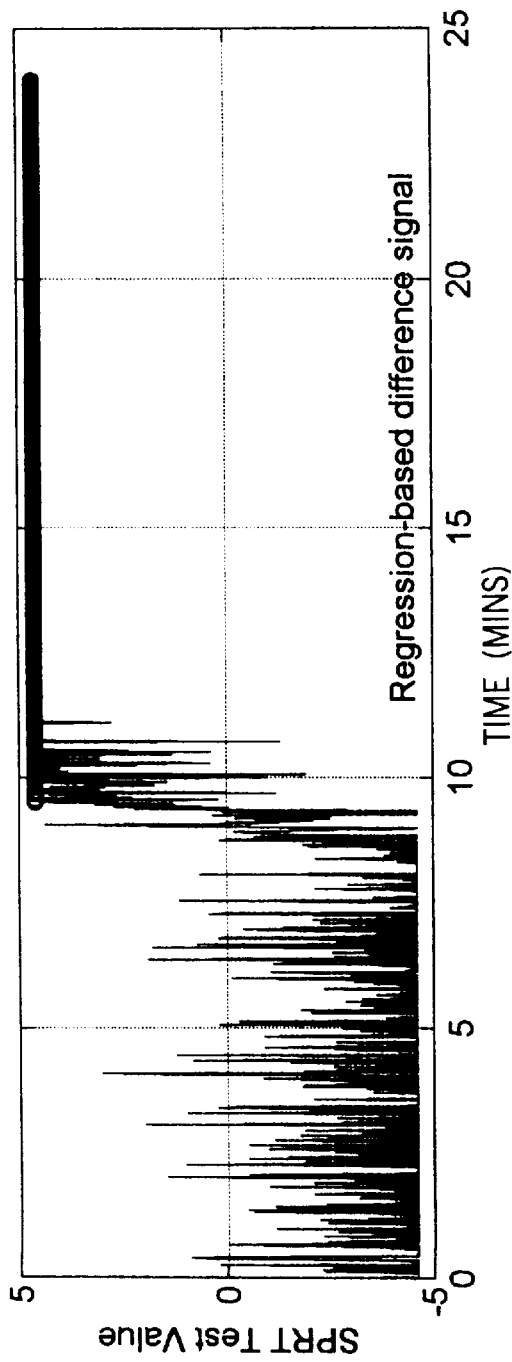
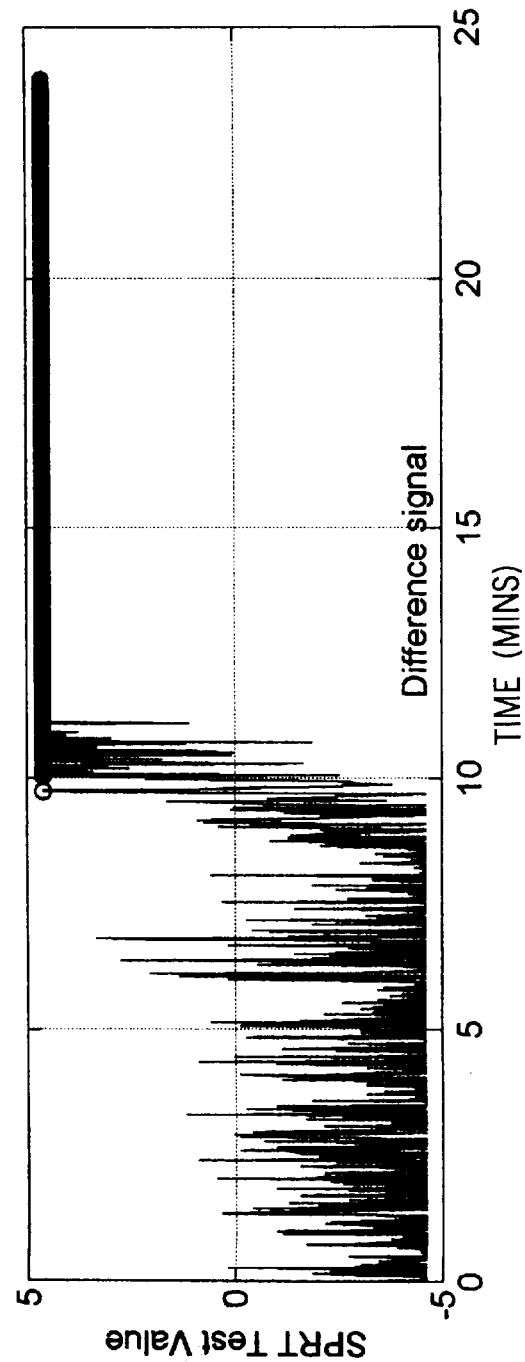

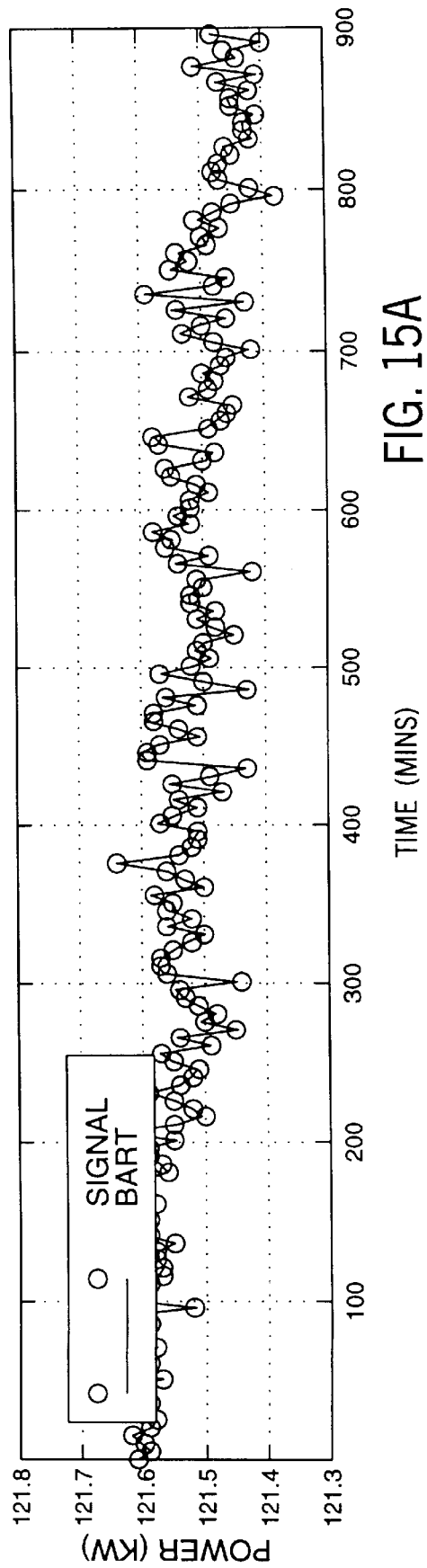
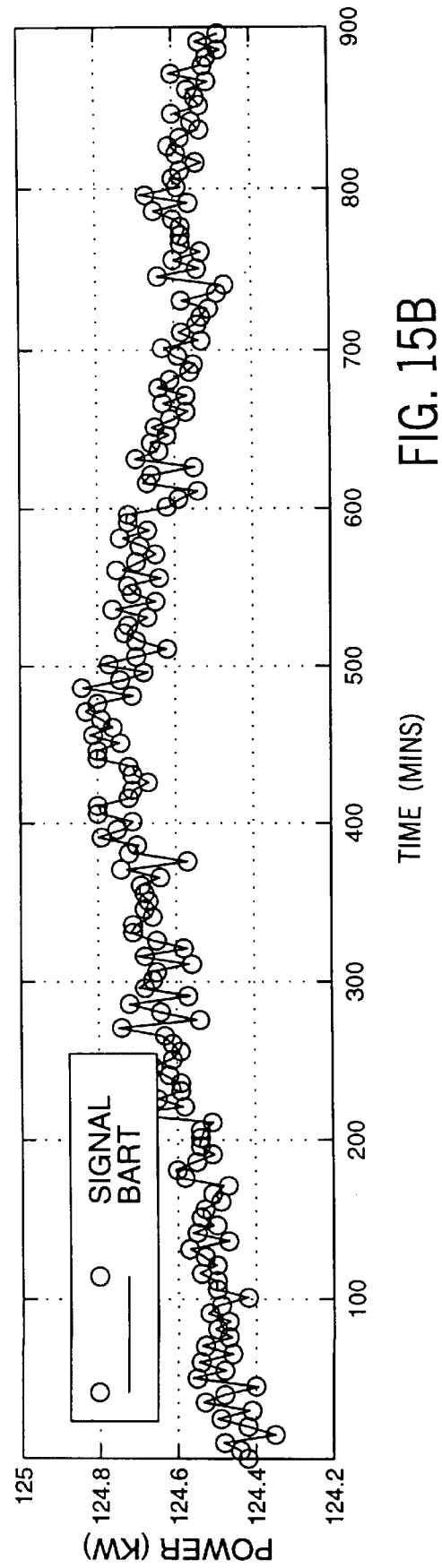

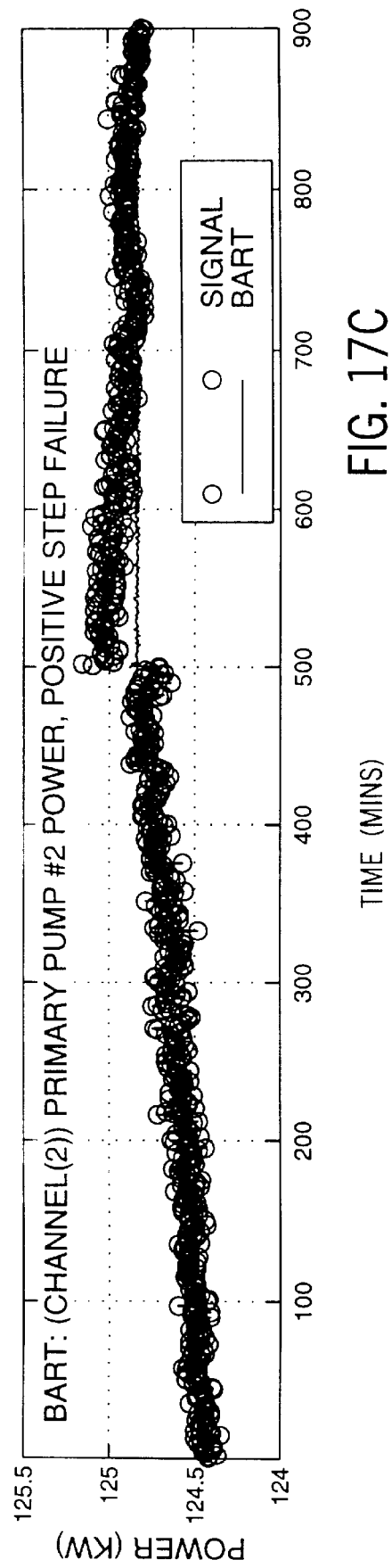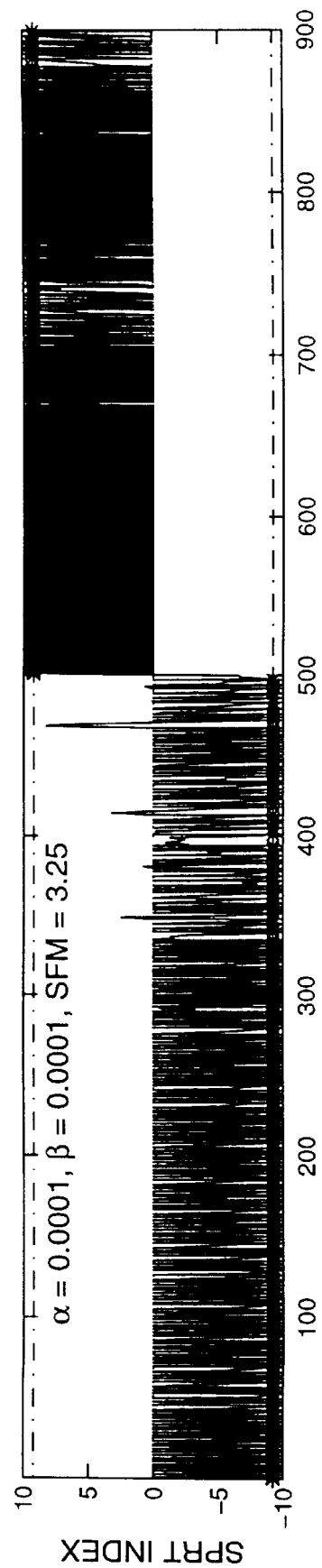

ULTRASENSITIVE SURVEILLANCE OF SENSORS AND PROCESSES

This invention was made with Government support under Contract No. W31-109-ENG-38 awarded by the Department of Energy. The Government has certain rights to this invention.

The present invention is related generally to a method and system for performing high sensitivity surveillance of various processes. More particularly the invention is related to a method and system for carrying out surveillance of any number of input signals and one or more sensors. In certain embodiments high sensitivity surveillance is performed utilizing a regression sequential probability ratio test involving two input signals which need not be redundant sensor signals, nor have similar noise distributions nor even involve signals from the same variable. In another form of the invention a bounded angle ratio test is utilized to carry out ultrasensitive surveillance.

Conventional parameter-surveillance schemes are sensitive only to gross changes in the mean value of a process or to large steps or spikes that exceed some threshold limit check. These conventional methods suffer from either large numbers of false alarms (if thresholds are set too close to normal operating levels) or a large number of missed (or delayed) alarms (if the thresholds are set too expansively). Moreover, most conventional methods cannot perceive the onset of a process disturbance or sensor deviation which gives rise to a signal below the threshold level or an alarm condition. Most methods also do not account for the relationship between a measurement by one sensor relative to another sensor measurement.

Another conventional methodology is a sequential probability ratio test (SPRT) which was originally developed in the 1940s for applications involving the testing of manufactured devices to determine the level of defects. These applications, before the advent of computers, were for manufactured items that could be counted manually. As an example, a company manufacturing toasters might sell a shipment of toasters under the stipulation that if greater than 8% of the toasters were defective, the entire lot of toasters would be rejected and replaced for free; and if less than 8% of the toasters were defective, the entire lot would be accepted by the company receiving them. Before the SPRT test was devised, the purchasing company would have to test most or all items in a shipment of toasters being received. For the toaster example, testing would continue until at least 92% of the toasters were confirmed to be good, or until at least 8% of the toasters were identified to be defective.

In 1948 Abraham Wald devised a more rigorous SPRT technique, which provided a formula by which the testing for defective manufactured items could be terminated earlier, and sometimes much earlier, while still attaining the terms of the procurement contract with any desired confidence level. In the foregoing example involving toasters, if the purchasing company were receiving 100 toasters and four of the first eight toasters tested were found to be defective, it is intuitively quite likely that the entire lot is going to be rejected and that testing could be terminated. Instead of going by intuition, however, Wald developed a simple, quantitative formula that would enable one to calculate, after each successive toaster is tested, the probability that the entire lot is going to be accepted or rejected. As soon as enough toasters are tested so that this probability reaches a pre-determined level, say 99.9% certainty, then a decision would be made and the testing could cease.

In the 1980s, other researchers began exploring the adaptation of Wald's SPRT test for an entirely new application, namely, surveillance of digitized computer signals. Now, instead of monitoring manufactured hardware units, the SPRT methodology was adapted for testing the validity of packets of information streaming from real-time physical processes. See, for example, U.S. Pat. Nos. 5,223,207; 5,410,492; 5,586,066 and 5,629,872.

These types of SPRT based surveillance systems have been finding many beneficial uses in a variety of application domains for signal validation and for sensor and equipment operability surveillance. As recited hereinbefore, conventional parameter-surveillance schemes are sensitive only to gross changes in the process mean, or to large steps or spikes that exceed some threshold limit check. These conventional methods suffer from either large false alarm rates (if thresholds are set too close) or large missed (or delayed) alarm rates (if the threshold are set too wide). The SPRT methodology therefore has provided a superior surveillance tool because it is sensitive not only to disturbances in the signal mean, but also to very subtle changes in the statistical quality (variance, skewness, bias) of the monitored signals.

A SPRT-based system provides a human operator with very early annunciation of the onset of process anomalies, thereby enabling him to terminate or avoid events which might challenge safety guidelines for equipment-availability goals and, in many cases, to schedule corrective actions (sensor replacement or recalibration; component adjustment, alignment, or rebalancing; etc.) to be performed during a scheduled plant outage. When the noise distributions on the signals are gaussian and white, and when the signals under surveillance are uncorrelated, it can be mathematically proven that the SPRT methodology provides the earliest possible annunciation of the onset of subtle anomalous patterns in noisy process variables. For sudden, gross failures of sensors or system components the SPRT methodology would annunciate the disturbance at the same time as a conventional threshold limit check. However, for slow degradation that evolves over a long time period (gradual decalibration bias in a sensor, wearout or buildup of a radial rub in rotating machinery, build-in of a radiation source in the presence of a noisy background signal, etc), the SPRT methodology can alert the operator of the incipience or onset of the disturbance long before it would be apparent to visual inspection of strip chart or CRT signal traces, and well before conventional threshold limit checks would be tripped.

Another feature of the SPRT technique that distinguishes it from conventional methods is that it has built-in quantitative false-alarm and missed-alarm probabilities. This is important in the context of safety-critical and mission-critical applications, because it makes it possible to apply formal reliability analysis methods to an overall expert system comprising many SPRT modules that are simultaneously monitoring a variety of plant variables.

A variety of SPRT-based online surveillance and diagnosis systems have been developed for applications in utilities, manufacturing, robotics, transportation, aerospace and health monitoring. Most applications to date, however, have been limited to systems involving two or more redundant sensors, or two or more pieces of equipment deployed in parallel with identical sensors for each device. This limitation in applicability of SPRT surveillance tools arises because the conventional SPRT equation requires exactly two input signals, and both of these signals have to possess identical noise properties.

It is therefore an object of the invention to provide an improved method and system for surveillance of a wide variety of industrial, financial, physical and biological systems.

It is another object of the invention to provide a novel method and system utilizing an improved SPRT system allowing surveillance of any number of input signals with or without sensor redundancy.

It is a further object of the invention to provide an improved method and system utilizing another improved SPRT type of system employing two input signals which need not come from redundant sensors, nor have similar noise distributions nor originate from the same physical variable but should have some degree of cross correlation.

It is still another object of the system to provide a novel method and system selectively employing an improved SPRT methodology which monitors a system providing only a single signal and/or an improved SPRT methodology employing two or more input signals having cross correlation depending on the current status of relationship and correlation between or among signal sets.

It is also a further object of the invention to provide an improved method and system employing a bounded angle ratio test.

It is yet another object of the invention to provide a novel method and system for surveillance of signal sources having either correlated or uncorrelated behavior and detecting the state of the signal sources enabling responsive action thereto.

It is an additional object of the invention to provide an improved method and system for surveillance of an on-line, real-time signals or off-line accumulated sensor data.

It is yet a further object of the invention to provide a novel method and system for performing preliminary analysis of signal sources for alarm or state analysis prior to data input to a downstream SPRT type system.

It is still an additional object of the invention to provide an improved method and system for ultrasensitive analysis and modification of systems and processes utilizing at least one of a single signal analytic technique, a two unique signal source technique and a bounded angle ratio test.

It is an additional object of the invention to provide a novel method and system for generating an estimated signal for each sensor in a system that comprises three or more sensors.

It is still another object of the invention to provide an improved method and system for automatically swapping in an estimated signal to replace a signal from a sensor identified to be degrading in a system comprising three or more signals.

Other objects, features and advantages of the present invention will be readily apparent from the following description of the preferred embodiments thereof, taken in conjunction with the accompanying drawings described below.

BRIEF DESCRIPTION OF THE DRAWINGS

FIG. 9A illustrates results of applying a SPRT test on a regression based difference signal; and FIG. 9B shows results of applying a SPRT test to the original difference signal;

FIG. 12A illustrates results of applying a SPRT test to the difference signal of FIG. 11A; and FIG. 12B illustrates results of applying a SPRT test to the difference signal of FIG. 11B;

FIG. 15A shows EBR-II channel 1, primary pump 1, power under normal operational conditions, and modeled BART;

FIG. 15B shows EBR-II channel 2, primary pump 2 power under normal operational conditions and modeled BART;

FIG. 17C shows an EBR-II primary pump power signal with an imposed positive step function;

FIG. 17D shows application of SPRT to the signals of FIG. 17C;

DETAILED DESCRIPTION OF PREFERRED EMBODIMENTS

Figure 1A:
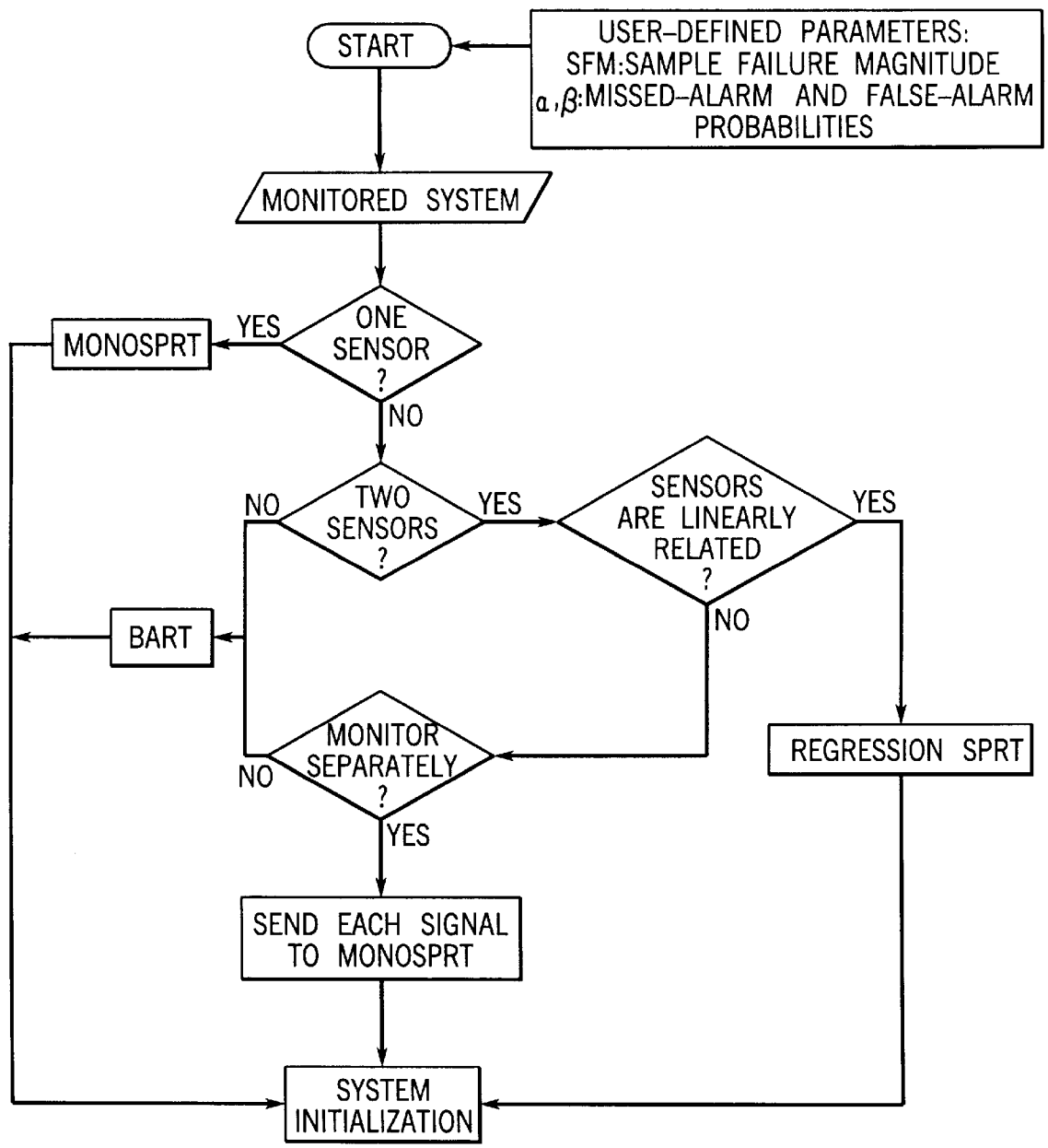
FIG. 1A illustrates a flow diagram of a selectable variety of embodiments of the invention.

A system 10 constructed in accordance with the invention is set forth in general in the flow chart of FIG. 1A. In describing various preferred embodiments, specific reference will be made throughout to application of the surveillance methodologies to specific industrial systems, such as nuclear reactors; however, the inventions are equally applicable to any system which provides signals or other data over time which describe attributes or parameters of the system. Therefore, the inventions herein are, for example, applicable to analysis, modification and termination of processes and systems involving physical, chemical, biological and financial sources of data or signals.

The system 10 is made up of three methodologies which, as appropriate, can be used separately, and possibly together, to monitor or validate data or signals. A series of logical steps can be taken to choose one or more of the methods shown in detail in FIGS. 1B–1D. Initialization of the system 10 is shown in FIG. 1A. The first step in the initialization is to obtain the user specified parameters; the Sample Failure Magnitude (SFM), the false alarm probability ($\alpha$), and the missed alarm probability ($\beta$). The next step in the initialization is to query the monitored system to obtain the sensor configuration information.

If the system has a single sensor the method selected for monitoring will be the MONOSPRT approach described immediately hereinafter. For the single sensor case, that is all that needs to be done to complete the initialization.

If the system has exactly two sensors, then information about the relationship between the two sensors is required. First, are the two sensors linearly related? If so, the regression SPRT algorithm is selected for monitoring, and this will be discussed in detail hereinafter. If the two sensors aren't linearly related, the next step is to check to see if they are non-linearly related. If so, the BART algorithm (described hereinafter) is used for monitoring. Otherwise, each sensor is monitored separately using the MONOSPRT method.

In a first preferred embodiment (MONOSPRT) involving surveillance and analysis of systems having only one source of signals or data, such as, non-safety grade nuclear reactors and many industrial, biological and financial processes, a highly sensitive methodology implements a sequential analysis technique when the decision process is based on a single, serially correlated stochastic process. This form of the invention is set forth in detail in FIG. 1B on the portion of the flow diagram of FIG. 1A directed to "one sensor" which activates a MONOSPRT methodology. Serial correlation can be handled by a vectorized type of SPRT (sequential probability ratio test) method which is based on a time series analysis, multivariate statistics and the parametric SPRT test (see, for example, U.S. Pat. Nos. 5,223,207; 5,410,492; 5,586,066 and 5,629,872 which describe details of various SPRT features and are incorporated by reference herein for such descriptions).

Figure 1B:
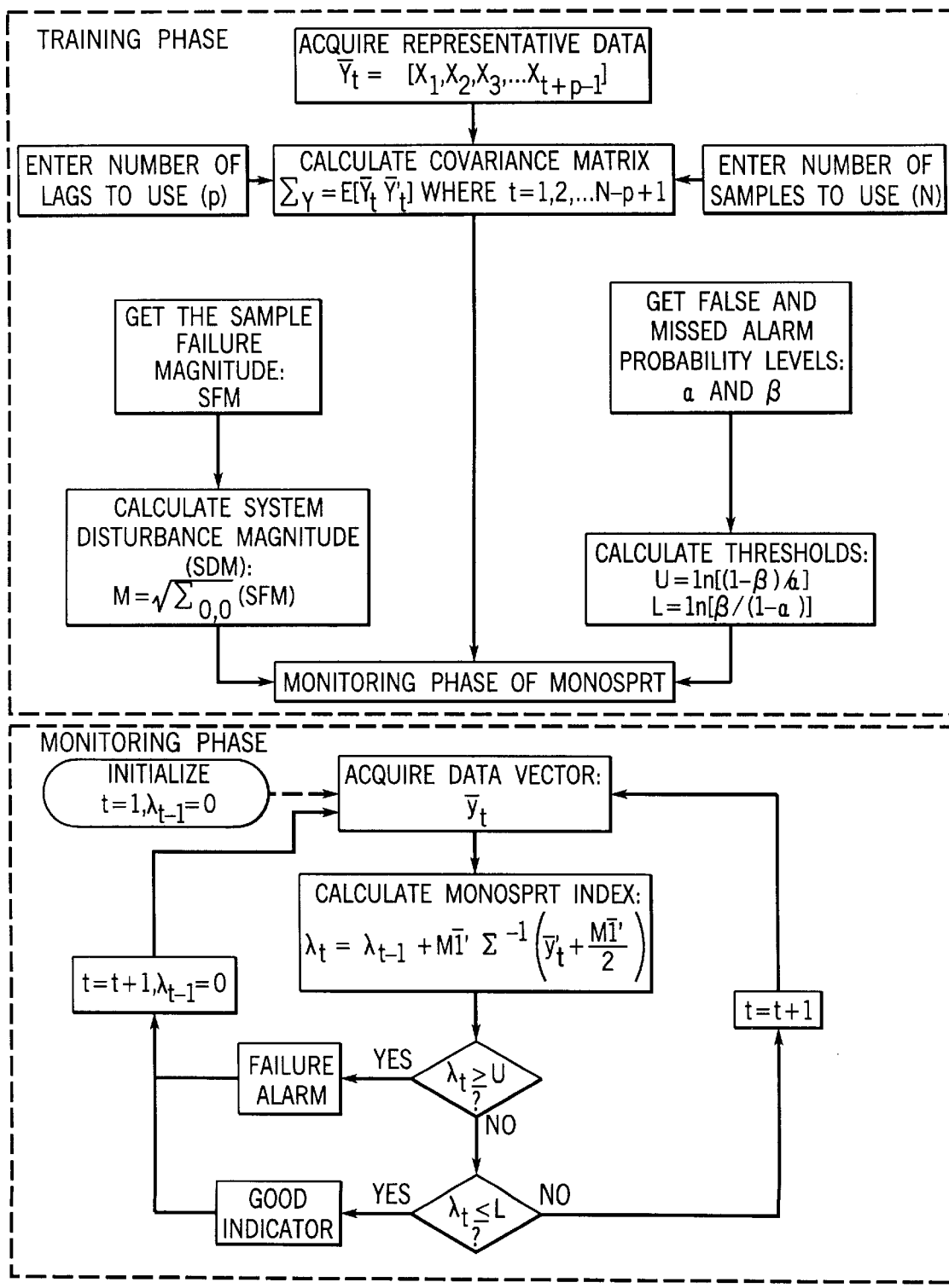
FIG. 1B illustrates a flow diagram of a MONOSPRT method of data analysis.

The MONOSPRT method is described in FIG. 1B. The method is split into two phases, a training phase and a monitoring phase. During the training phase N samples are collected from the single sensor (or data source) that are representative of normal operation. Next, a covariance matrix is constructed from the representative data that is $p_x p$, where p is the user specified number of lags to consider when characterizing the autocorrelation structure of the sensor signal. The final steps in the training phase of the MONOSPRT method are to calculate the SPRT parameters; SDM, L and U. The SDM (System Disturbance Magnitude) is calculated by multiplying the standard deviation of the sensor signal with the SFM specified during the system initialization. The standard deviation of the sensor signal is the square root of the diagonal elements of the covariance matrix. L and U are the lower and upper thresholds used for to compare the MONOSPRT indexes to in order to make a failure decision. Both L and U are functions of $\alpha$ and $\beta$ specified during system initialization.

During the monitoring phase of MONOSPRT a data vector of length p is acquired at each time step t and is used in the calculation of the MONOSPRT index $\lambda$. The index is then compared to L and H. If the MONOSPRT index is greater than or equal to U, then the sensor signal is not behaving normally and a failure alarm is annunciated. If the MONOSPRT index is less than or equal to L then the decision that the sensor is good is made. In either case, after a decision is made in the MONOSPRT index is reset to zero and the process continues.

In this vectorized SPRT methodology, (hereinafter "MONOSPRT"), suppose there exists the following stationary, a periodic sequence of serially correlated random variables: $\{X'\}_t$, where t=1, 2, 3 ..., N. It is conventional that a periodic sequence can be handled by removing the periodic component of the structural time series model, and a non-stationary sequence can be differenced to produce a stationary sequence. The stationary assumption provides constant mean, constant variance and covariances that depend only on the separation of two variates in time and not the actual times at which they were recorded. The mean, $\mu$, is given by $$\mu = E[X'_t]$$

where $E[\cdot]$ is the expectation operator. If we let $X_t = X'_t - \overline{X}$ where, $$\overline{X} = \frac{1}{n_s}\sum_{i=1}^{n_s} X'_i$$

and $n_s$ is the sample size, then $E[X_t]=0$. The autocovariance of two time points, $X_t$ and $X_s$ is $\sigma_{|t-s|}=E[X_t X_s]$, where s and t are integers in the set $\{[1, N]\}$ and $\sigma_0$ is the variance. Suppose there exists $p<N$ such that for every $m>p$: $\sigma_m<\delta$, where $\delta$ is arbitrarily close to 0.

$$\text{let } \overline{Y}_t = \begin{Bmatrix} X_t \\ X_{t+1} \\ X_{t+2} \\ \vdots \\ X_{t+p-1} \end{Bmatrix}, \text{ where } t = 1, 2, 3 \ldots, N-p+1 \quad (1)$$

Therefore, we have constructed a stationary sequence of random vectors. The mean of the sequence $\overline{Y}$ is $\overline{O}$ where $\overline{O}$ is the zero vector with p rows. The variance of the sequence is the covariance matrix $\Sigma_Y$.

$$\sum_Y = E[\tilde{Y}_t \tilde{Y}'_t] = \begin{bmatrix} \sigma_0 & \sigma_1 & \sigma_2 & \cdots & \sigma_{p-1} \\ \sigma_1 & \sigma_0 & \sigma_1 & \cdots & \sigma_{p-2} \\ \sigma_2 & \sigma_1 & \sigma_0 & & \vdots \\ \vdots & \vdots & & \ddots & \sigma_1 \\ \sigma_{p-1} & \sigma_{p-2} & \cdots & \sigma_1 & \sigma_0 \end{bmatrix} \quad (2)$$

The SPRT type of test is based on the maximum likelihood ratio. The test sequentially samples a process until it is capable of deciding between two alternatives: $H_0$: $\mu=0$; and $H_A$: $\mu=M$. It has been demonstrated that the following approach provides an optimal decision method (the average sample size is less than a comparable fixed sample test). A test statistic, $\lambda_t$, is computed from the following formula:

$$\lambda_t = \sum_{i=1+j}^{t} \ln\left[\frac{f_{H_A}(\tilde{y}_i)}{f_{H_0}(\tilde{y}_i)}\right] \quad (3)$$

where $\ln(\cdot)$ is the natural logarithm, $f_{H_s}()$ is the probability density function of the observed value of the random variable $Y_i$ under the hypothesis $H_s$ and j is the time point of the last decision.

In deciding between two alternative hypotheses, without knowing the true state of the signal under surveillance, it is possible to make an error (incorrect hypothesis decision). Two types of errors are possible. Rejecting $H_0$ when it is true (type I error) or accepting $H_0$ when it is false (type II error). We would like to control these errors at some arbitrary minimum value, if possible. We will call the probability of making a type I error, $\alpha$, and the probability of making a type II error $\beta$. The well-known Wald's Approximation defines a lower bound, L, below which one accepts $H_0$ and an upper bound, U beyond which one rejects $H_0$.

$$U = \ln\left[\frac{1-\beta}{\alpha}\right] \quad (4)$$

$$L = \ln\left[\frac{\beta}{1-\alpha}\right] \quad (5)$$

Decision Rule: if $\lambda_t<L$, then ACCEPT $H_0$;
else if $\lambda_t <U$, then REJECT $H_0$; otherwise, continue sampling.

To implement this procedure, this distribution of the process must be known. This is not a problem in general, because some a priori information about the system exists. For our purposes, the multivariate Normal distribution is satisfactory.

Multivariate Normal:

$$f_{H_S}(\tilde{y}_t) = (2\pi)^{-\frac{P}{2}}\left[|\sum\nolimits_Y|\right]^{-\frac{1}{2}} e^{-\frac{1}{2}[[\tilde{y}_t - \mu_{H_S}\bar{1}_p]\sum_Y^{-1}[\tilde{y}_t - \mu_{H_S}\bar{1}_p]]} \quad (6)$$

where S is either 0 or A. Therefore:

$$f_{H_S}(\tilde{y}_t) = (2\pi)^{-\frac{P}{2}}\left[|\sum\nolimits_Y|\right]^{-\frac{1}{2}} e^{-\frac{1}{2}[[\tilde{y}_t - \mu_{H_S} M\bar{1}_p]\sum_Y^{-1}[\tilde{y}_t - \mu_{H_S} M\bar{1}_p]]} \quad (7)$$

$$\lambda_t = \frac{1}{2}\sum_{i=1+j}^{t}\left[(\tilde{y}')_i \sum\nolimits_Y^{-1} \tilde{y}_i - [\tilde{y}_i - M\bar{1}_p]\sum\nolimits_Y^{-1}[\tilde{y}_i - M\bar{1}_p]\right] \quad (8)$$

The equation for $\lambda_t$ can be simplified into a more computationally efficient form as follows:

$$\lambda_t = \frac{1}{2}\sum_{i=1+j}^{t}\left[2M\bar{1}'\sum\nolimits^{-1}\tilde{y}_i - M\bar{1}'\sum\nolimits^{-1}M\bar{1}\right] \quad (9)$$

$$= \frac{1}{2}M\bar{1}'\sum\nolimits^{-1}\sum_{i=1+j}^{t}(2\tilde{y}_i - M\bar{1})$$

$$= M\bar{1}'\sum\nolimits^{-1}\sum_{i=1+j}^{t}\left(\tilde{y}_i - \frac{M\bar{1}}{2}\right)$$

For the sequential test the equation is written as $$\lambda_{t+1} = \lambda_t + M\bar{1}\sum\nolimits^{-1}\left(\tilde{y}_{t+1} + \frac{M\bar{1}}{2}\right) \quad (10)$$

In practice, we implement two separate tests. One test is for M greater than zero and the second test for M less than zero. Here, M is chosen by the evaluating, $$\overline{M}=[1\ 1\ 1\ \ldots\ 1]\sigma_0 k \quad (11)$$

where k is a user specified constant that is multiplied by the standard deviation of y. M is then used in equation (10) to determine the amount of change in the mean of y that is necessary to accept the alternative hypothesis.

FIGS. 2A–2F show results after applying the MONO-SPRT embodiment to a sinusoid containing no disturbance, a step disturbance, and a linear drift. In these examples the noise added to the sinusoid is Gaussian and white with a variance of 2. The sinusoid has an amplitude of 1, giving an overall signal-to-noise ratio ("SNR" hereinafter) of 0.25 (for a pure sinusoid SNR=$0.5A^2/\sigma^2$, where $\sigma^2$ is the variance of the noise and A is the amplitude of the sinusoid). The autocorrelation matrix used in MONOSPRT for these examples were calculated using 30 lags. The false alarm probability α and missed alarm probability β are both specified to be 0.0001 for MONOSPRT, and the sample failure magnitude (SFM) is set to 2.5.

Figure 2A:
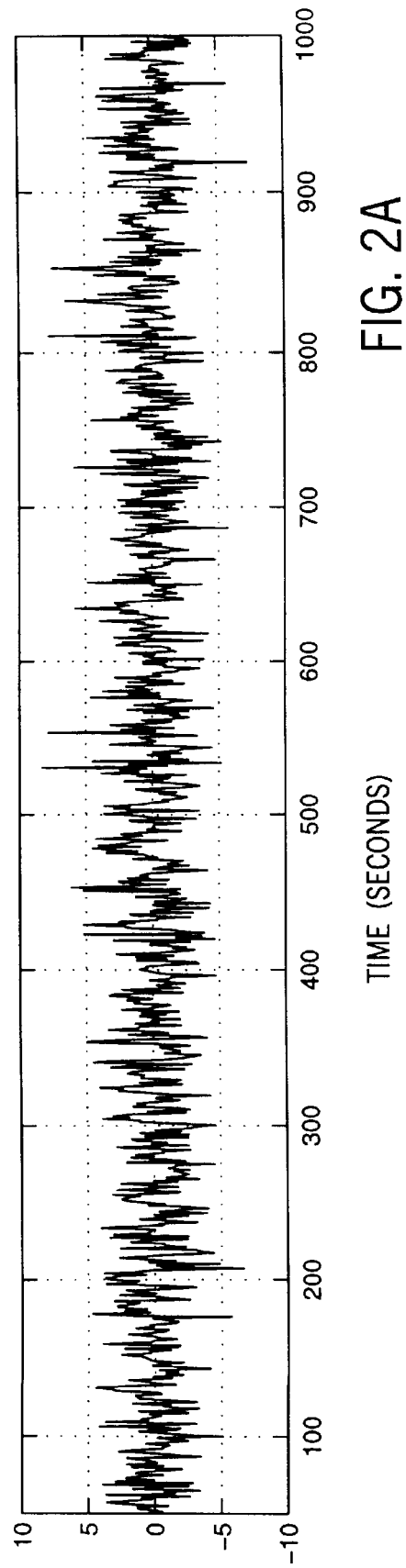
FIG. 2A illustrates a sinusoidal signal characteristic of normal operation.
Figure 2B:
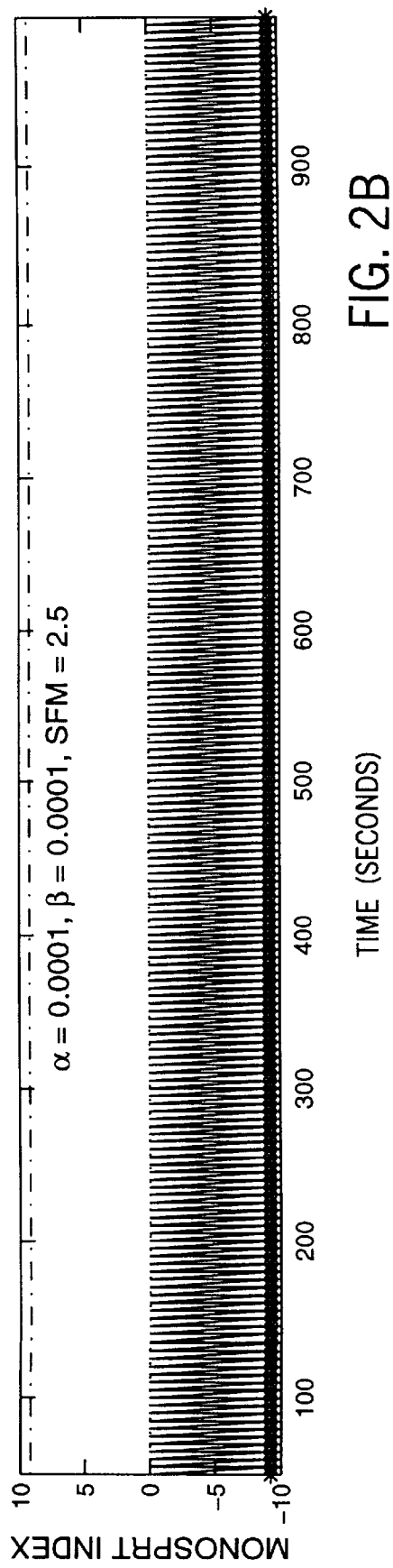
FIG. 2B shows MONOSPRT analysis of the signal of FIG. 2A.
Figure 2C:
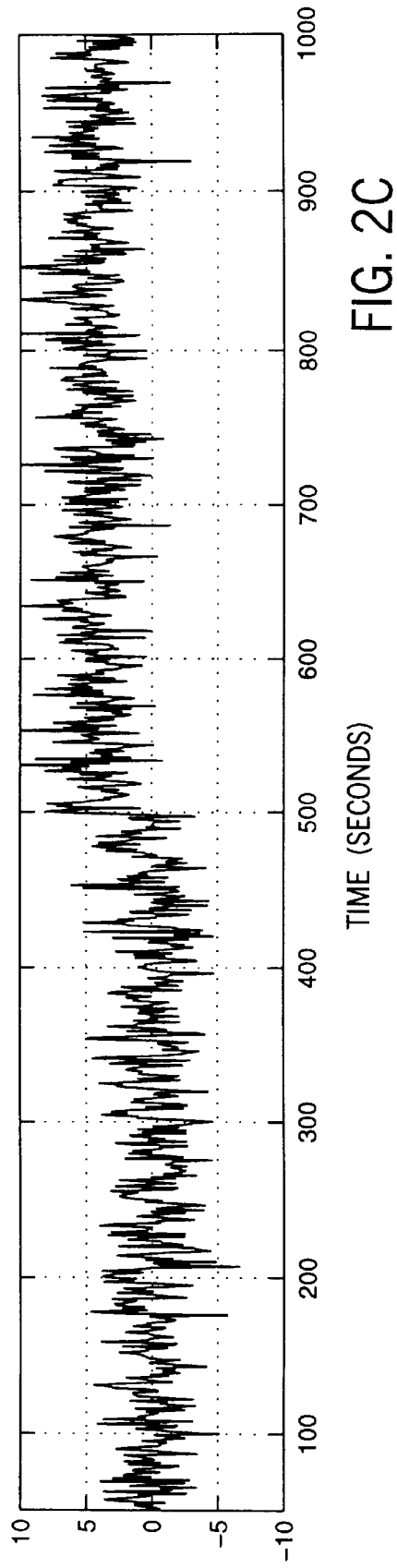
FIG. 2C illustrates a sinusoidal signal with an imposed step signal at 500 seconds.
Figure 2D:
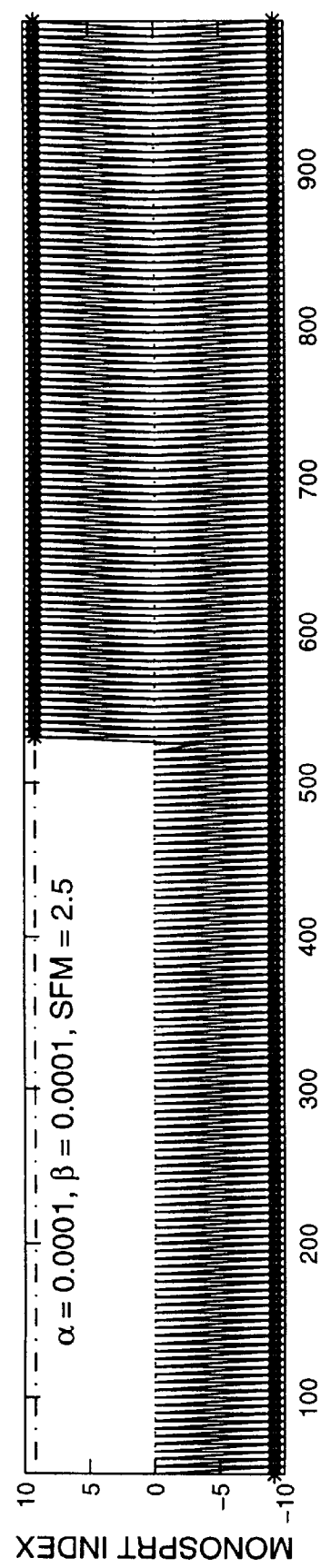
FIG. 2D shows MONOSPRT analysis of the signal of FIG. 2C.

FIG. 2A shows the sinusoid with noise without any disturbance being present. FIG. 2B is the resulting MONOSPRT when applied to the signal. FIGS. 2C and 2D illustrate the response of MONOSPRT to a step change in the sinusoid. The magnitude of the step is $2\sigma_s$, where $\sigma_s$ is the standard deviation of the sinusoid plus the noise. The step begins at time 500 seconds. Due to the low SNR, MONOSPRT takes 25 samples to alarm, indicating that the signal is not at a peak in the sinusoid but rather that the mean of the overall signal has changed.

Figure 2E:
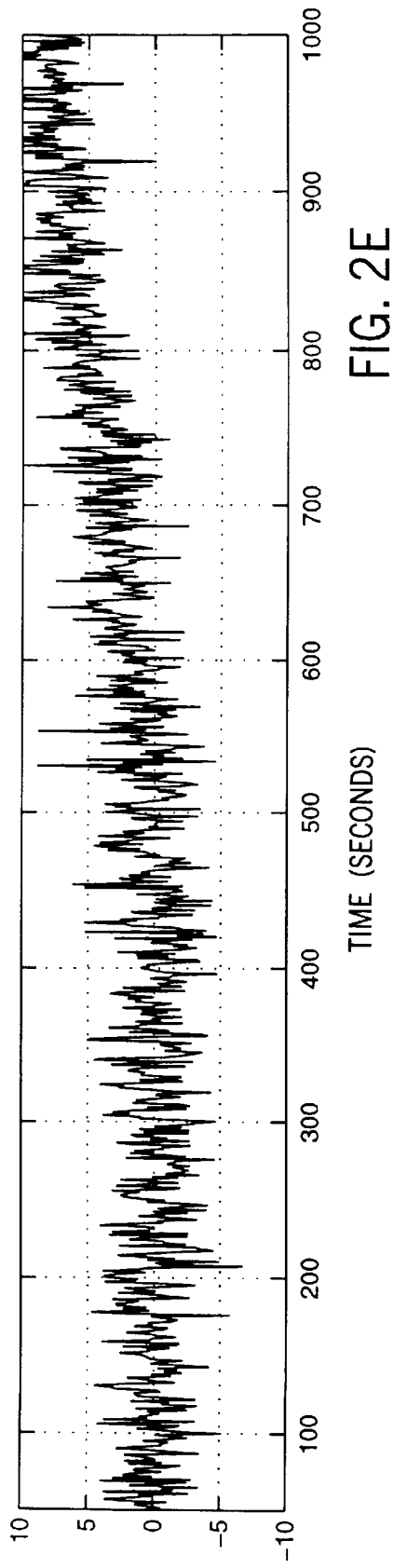
FIG. 2E illustrates a sinusoidal signal with an imposed drift signal started at 500 seconds.
Figure 2F:
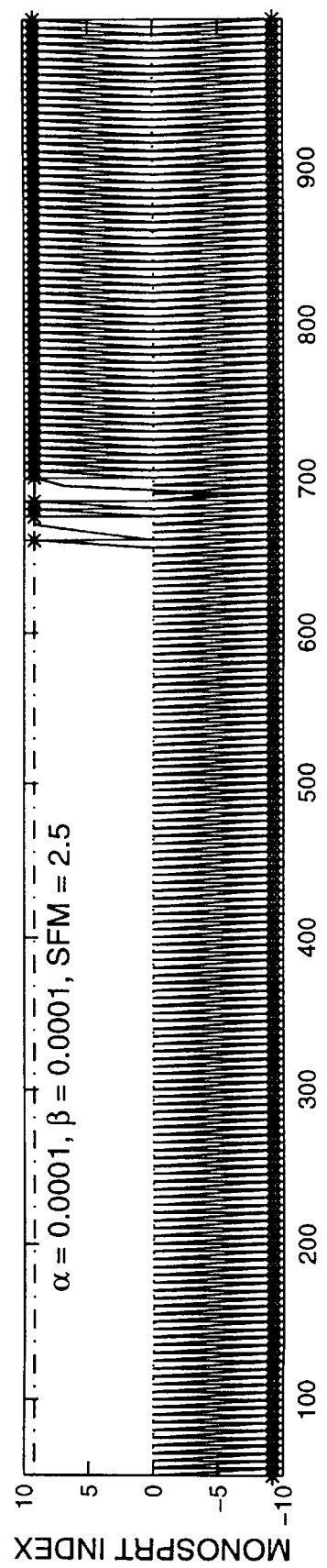
FIG. 2F shows MONOSPRT analysis of the signal of FIG. 2E.
Figure 3A:
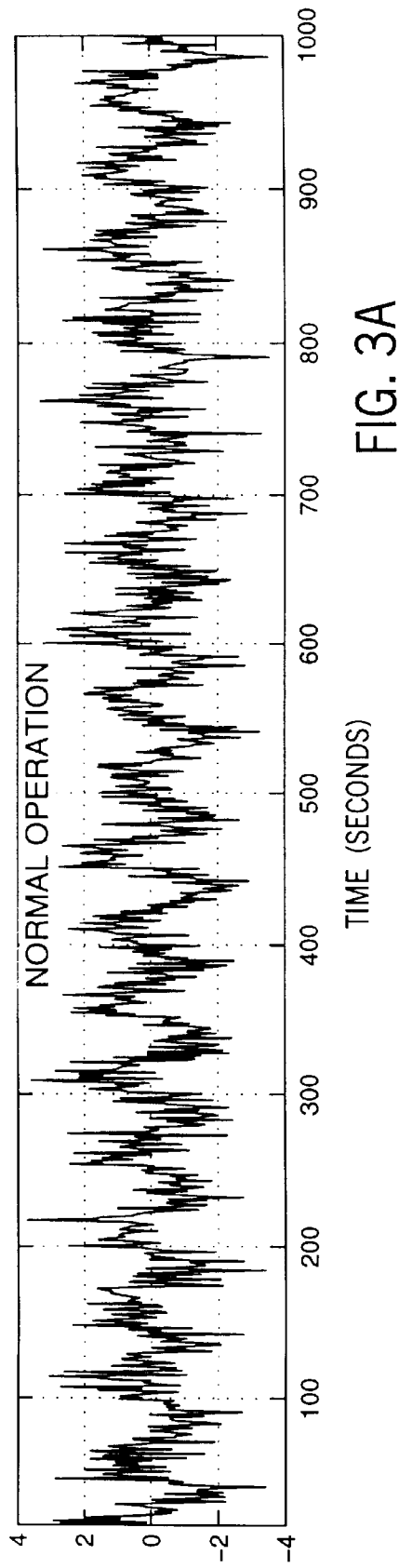
FIG. 3A illustrates another sinusoidal signal with a doubled signal to noise ratio ("SNR") compared to FIG. 2A.
Figure 3B:
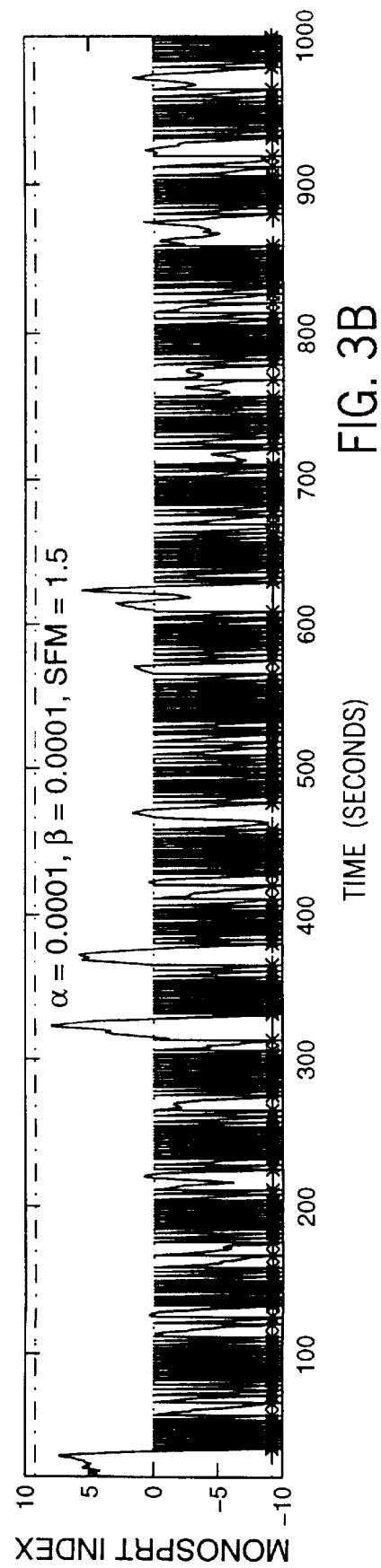
FIG. 3B shows MONOSPRT analysis of the signal of FIG. 3A.
Figure 3C:
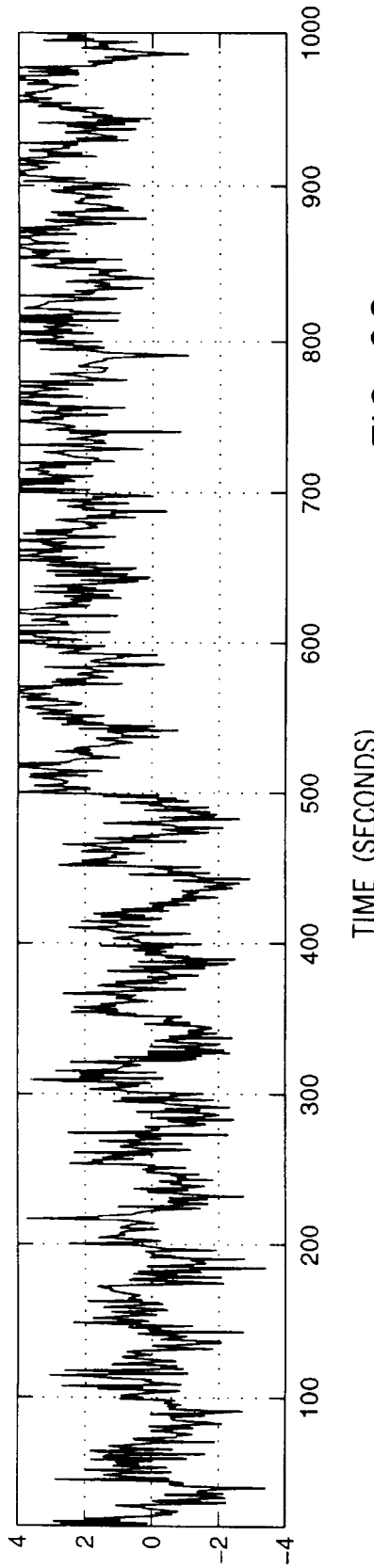
FIG. 3C illustrates a sinusoidal signal with an imposed step signal at 500 seconds.
Figure 3D:
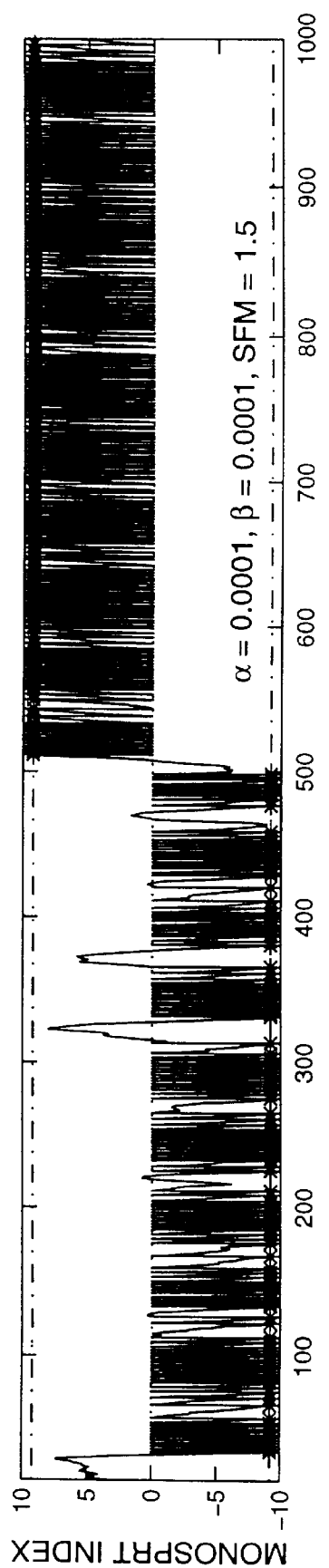
FIG. 3D shows MONOSPRT analysis of the signal of FIG. 3C.
Figure 3E:
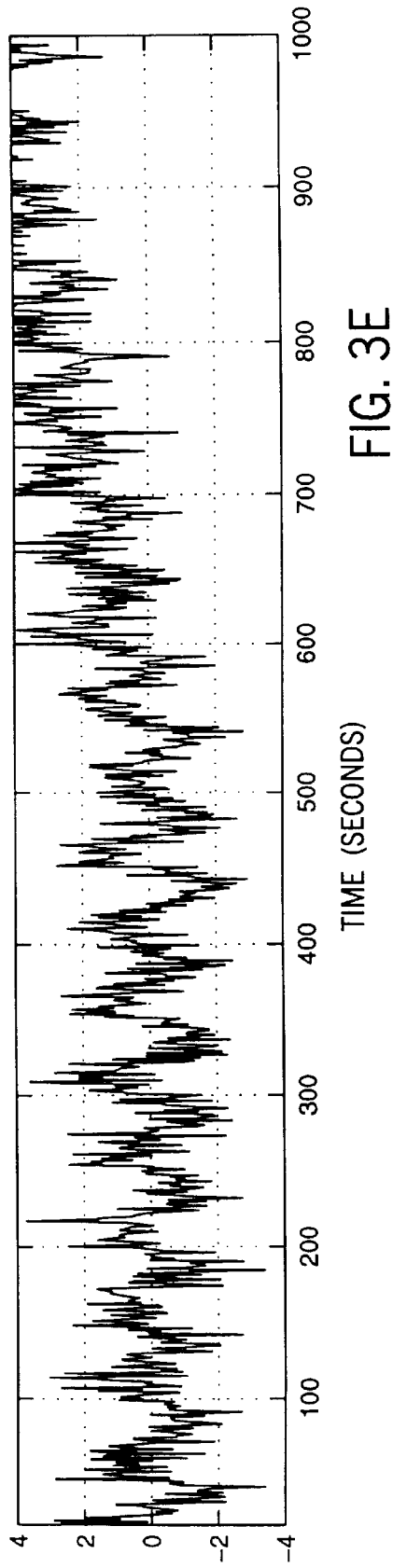
FIG. 3E illustrates a sinusoidal signal with an imposed drift signal started at 500 seconds.
Figure 3F:
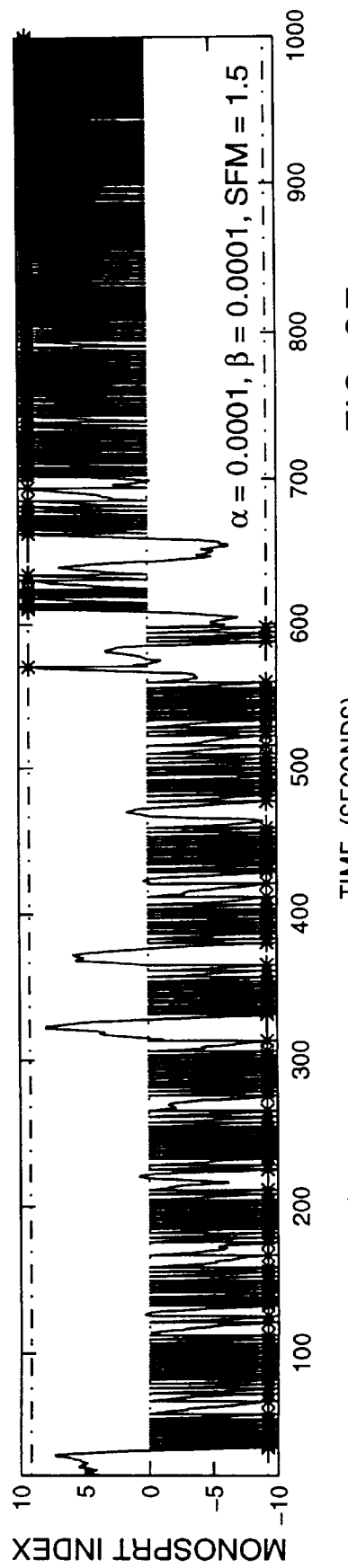
FIG. 3F shows MONOSPRT analysis of the signal of FIG. 3E.

In FIGS. 2E and 2F analogous MONOSPRT results are shown for a linear drift introduced into the noisy sinusoid signal. Here, the drift starts at time 500 seconds at a value of 0 and increases linearly to a final value of $4\sigma_s$ at 1000 seconds. MONOSPRT detects the drift when it has reached a magnitude of approximately $1.5\sigma_s$.

In FIGS. 3A–3F the results of running the same experiment are shown except this time the SNR is 0.5 and the SFM is changed to 1.5. The degree of autocorrelation is much higher in this case, but MONOSPRT can detect the disturbances more quickly due to the increased SNR.

Figure 4A:
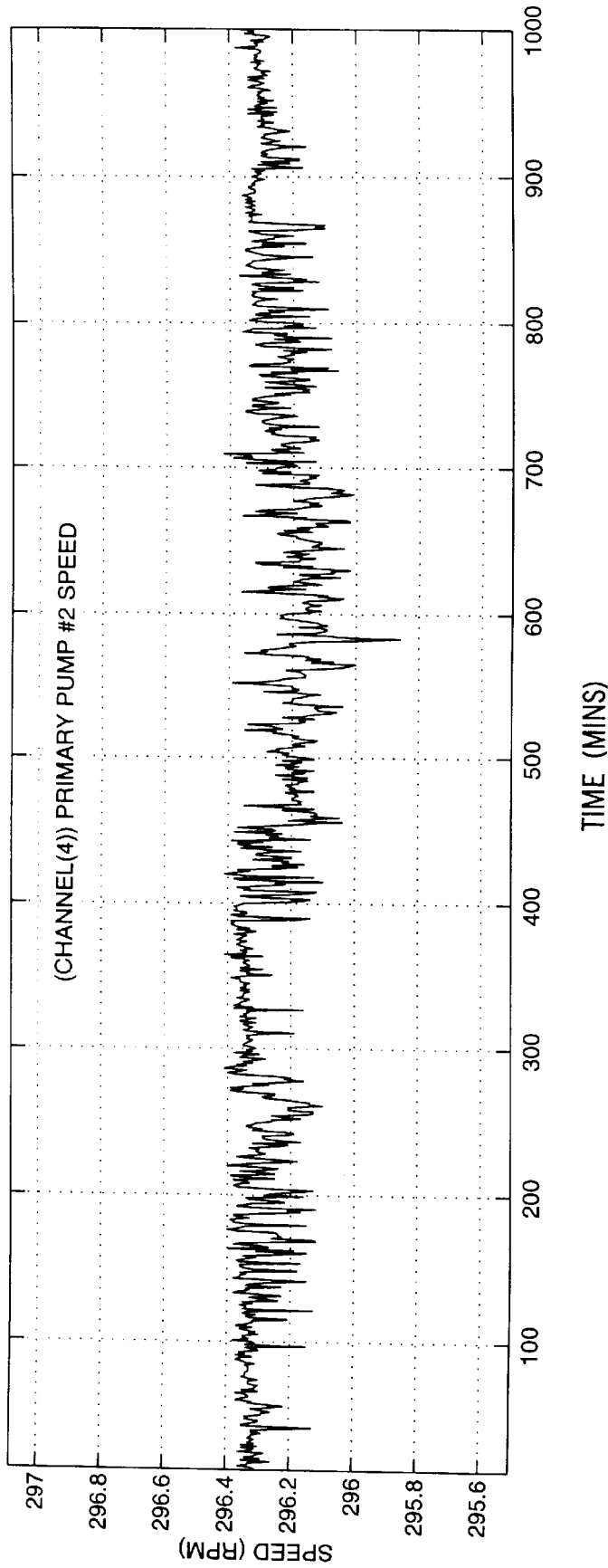
FIG. 4A illustrates normal sensor signals from an EBR-II reactor channel pump.
Figure 4B:
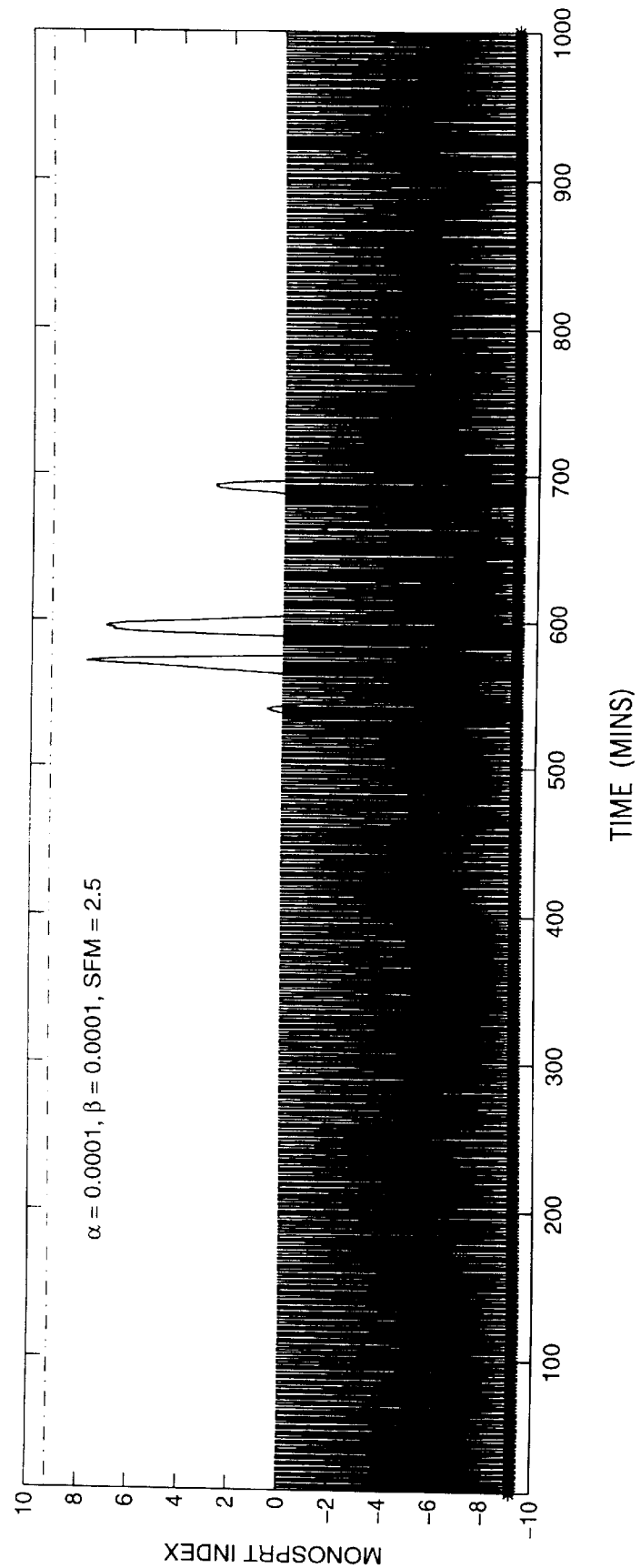
FIG. 4B illustrates MONOSPRT analysis of the signal of FIG. 4A.

To test MONOSPRT on an actual sensor signal exhibiting non-white characteristics a sensor signal was selected from the primary pump #2 of the EBR-II nuclear reactor at Argonne National Laboratory (West) in Idaho. The signal is a measure of the pump's speed over a 1000 minute interval. FIG. 4A shows the sensor signal under normal operating conditions. The MONOSPRT results are shown in FIG. 4B. For this example α and β are specified to be 0.0001 and the SFM is 2.5. The autocorrelation matrix was calculated using 10 lags.

Figure 5A:
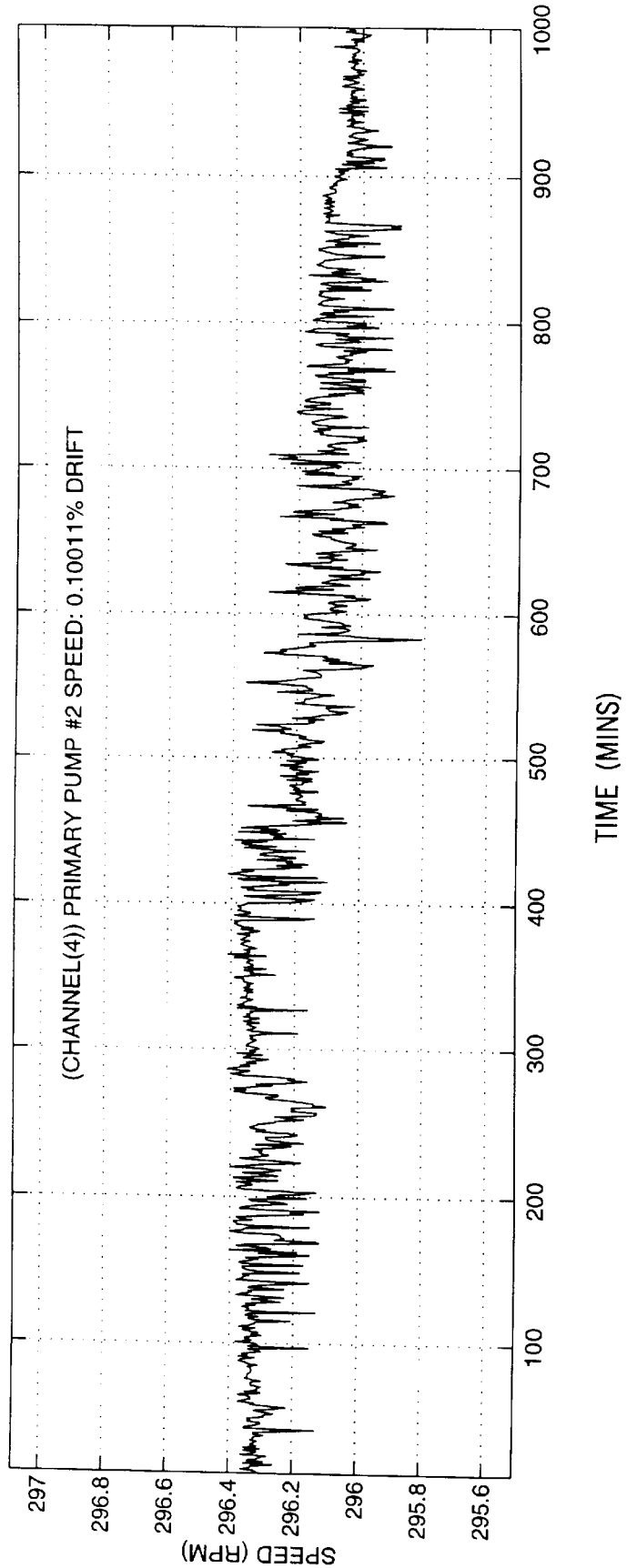
FIG. 5A illustrates sensor signals of FIG. 4A plus an imposed drift starting at 500 minutes from initiation of data accumulation.
Figure 5B:
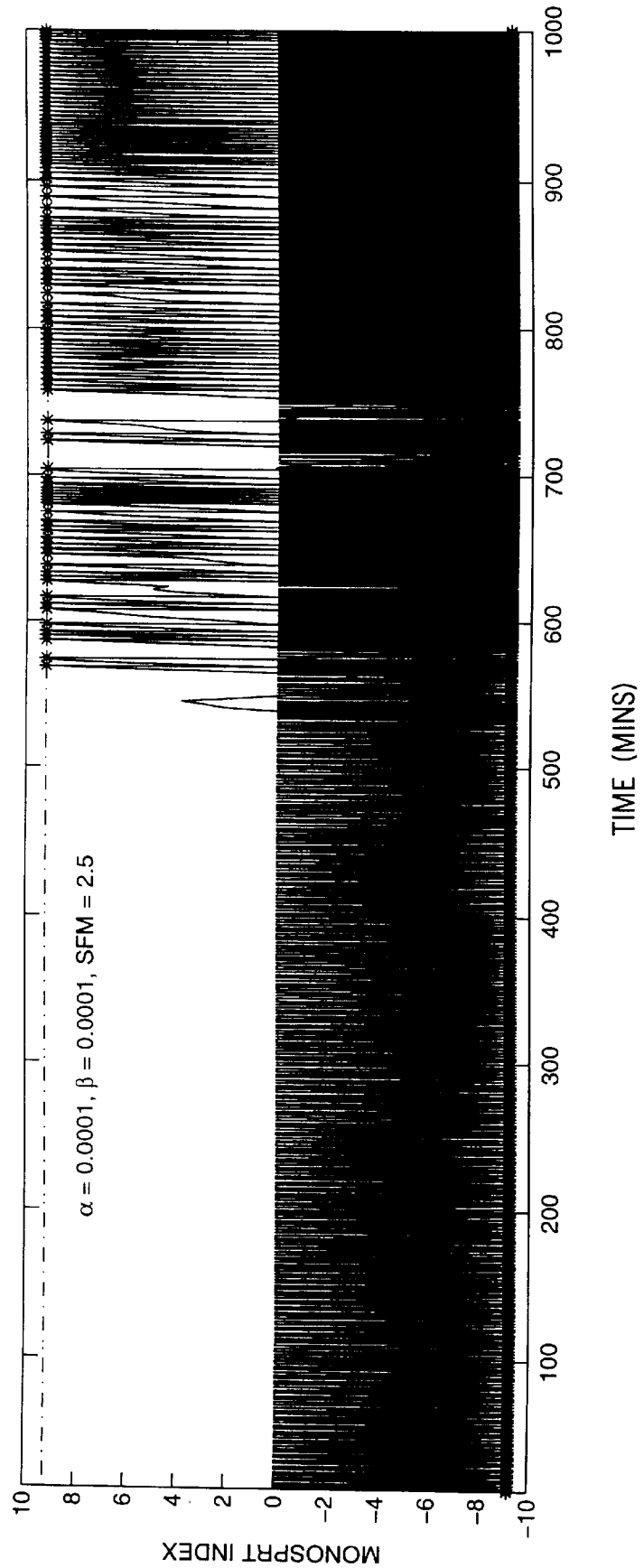
FIG. 5B shows MONOSPRT analysis of the signal of FIG. 5A.

In FIGS. 5A and 5B MONOSPRT results are shown when a very subtle sensor drift is simulated. FIG. 5A is the sensor signal with a linear drift starting at time 500 min and continuing through the rest of the signal to a final value of −0.10011% of the sensor signal magnitude. MONOSPRT detects this very small drift after about only 50 min, i.e. when the drift has reached a magnitude of approximately 0.01% of the signal magnitude. The MONOSPRT plot is shown in FIG. 5B with the same parameter settings as were used in FIG. 4B. FIG. 5B illustrates the extremely high sensitivity attainable with the new MONOSPRT methodology.

In another preferred embodiment (the regression SPRT method of FIG. 1C), a methodology provides an improved method for monitoring redundant process signals of safety- or mission-critical systems. In the flow diagram shown in FIG. 1C., the method is split into two phases, a training phase and a monitoring phase. During the training phase N data samples are collected from both sensors when the system is operating normally. The two data sets are then used to calculate the regression coefficients m and b using the means of both sensor signals ($\mu_1$ and $\mu_2$), the autocorrelation coefficient of one of the sensors ($\sigma_{22}$), and the cross-correlation coefficient ($\sigma_{12}$) between both sensors. The SPRT parameters are also calculated in the same manner as was calculation of the SDM is from the regression difference function.

During the monitoring phase of the regression SPRT method, a regression based difference ($D_t$) is generated at each time point t. The regression based difference is then used to calculate the SPRT index and to make a decision about the state of the system or sensors being monitored. The logic behind the decision is analogous to the decision logic used in the MONOSPRT method. Further details are described hereinafter.

In this method, known functional relationships are used between process variables in a SPRT type of test to detect the onset of system or sensor failure. This approach reduces the probability of false alarms while maintaining an extremely high degree of sensitivity to subtle changes in the process signals. For safety- or mission-critical applications, a reduction in the number of false alarms can save large amounts of time, effort and money due to extremely conservative procedures that must be implemented in the case of a failure alarm. For example, in nuclear power applications, a failure alarm could cause the operators to shut down the reactor in order to diagnose the problem, an action which typically costs the plant a million dollars per day.

Figure 1C:
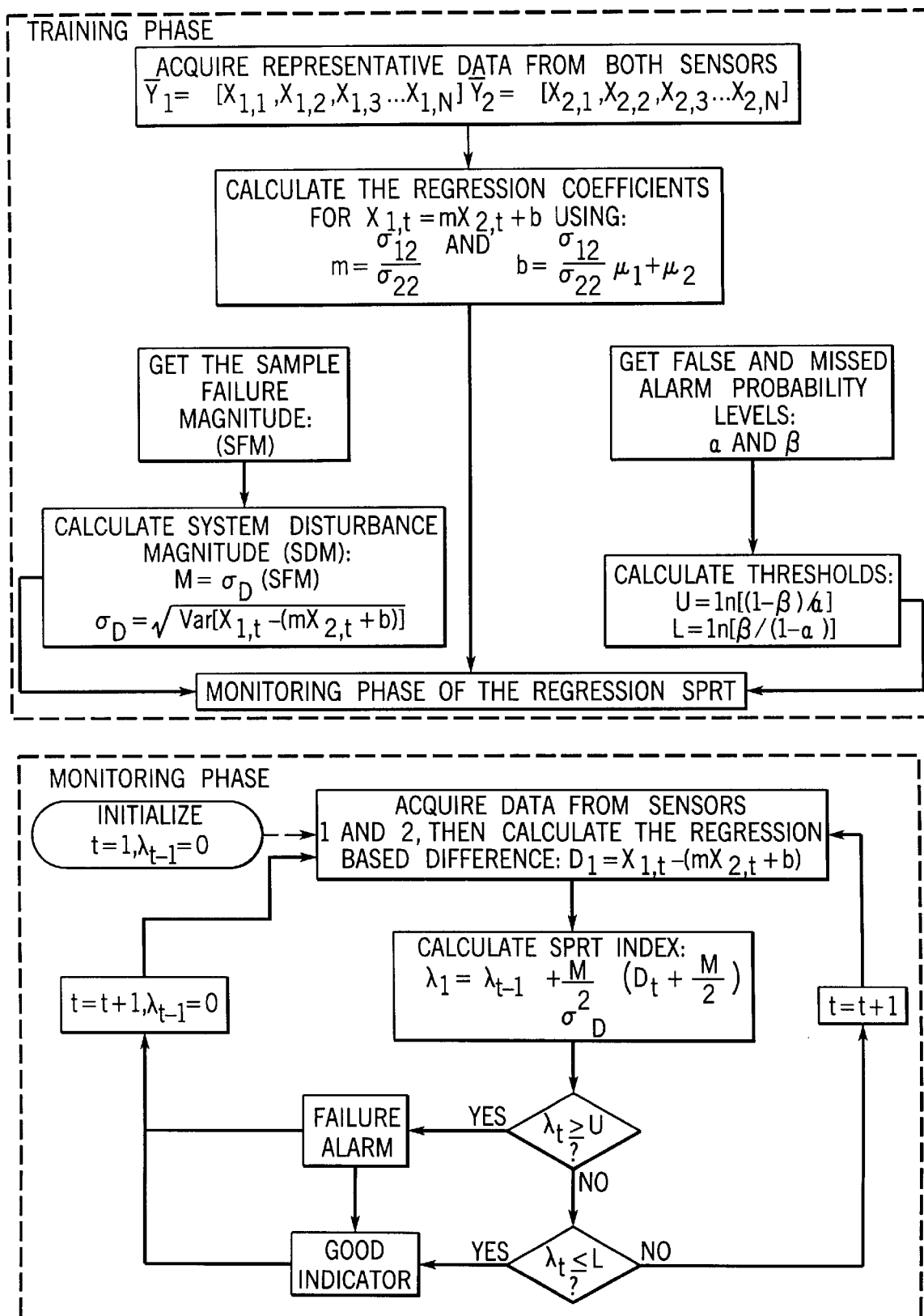
FIG. 1C illustrates a flow diagram of a regression SPRT method of data analysis.

In this preferred embodiment shown schematically in flow diagram FIG. 1C (two sensors, linearly related), highly redundant process signals can be monitored when the signals have a known functional relationship given by $$X_1 = f(X_2) \quad (12)$$

where f( ) is some function determined by physical laws or by known (or empirically determined) statistical relationships between the variables. In principle, if either of the process signals $X_1$ or $X_2$ have degraded (i.e. fallen out of calibration) or failed, then (12) will no longer hold. Therefore, the relationship (12) can be used to check for sensor or system failure.

In practice, both monitored process signals, or any other source of signals, contain noise, offsets and/or systematic errors due to limitations in the sensors and complexity of the underlying processes being monitored. Therefore, process failure cannot be detected simply by checking that (12) holds. More sophisticated statistical techniques must be used to ensure high levels of noise or offset do not lead to false and missed failure alarms. This preferred embodiment involves (a) specifying a functional relationship between $X_1$ and $X_2$ using known physical laws or statistical dependencies and linear regression when the processes are known to be in control, and (b) using the specified relationship from (a) in a sequential probability ratio test (SPRT) to detect the onset of process failure.

For example, in many safety- or mission-critical applications, multiple identical sensors are often used to monitor each of the process variables of interest. In principle, each of the sensors should give identical readings unless one of the sensors is beginning to fail. Due to measurement offsets and calibration differences between the sensors, however, the sensor readings may be highly statistically correlated but will not be identical. By assuming that the sensor readings come from a multivariate normal distribution, a linear relationship between the variables can be specified. In particular, for two such sensor readings it is well-known that the following relationship holds $$E[X_1|X_2] = \sigma_{12}/\sigma_{12}(X_2 - u_2) + u_1 \quad (13)$$

where $E[X_1|X_2]$ is the conditional expectation of the signal $X_1$ given $X_2$, $\sigma_{12}$ is the square root of the covariance between $X_1$ and $X_2$. The $\sigma_{22}$ is the standard deviation of $X_2$, and $u_1$ and $u_2$ are the mean of $X_1$ and $X_2$, respectively. Equation (13) is simply a linear function of $X_2$ and can therefore be written $$X_1 = mX_2 + b \quad (14)$$

In practice, the slope $m = \sigma_{12}/\sigma_{22}$ and intercept $b = -\sigma_{12}/\sigma_{22}u_2 + u_1$ can be estimated by linear regression using data that is known to have no degradation or failures present.

Once a regression equation is specified for the relationship between $X_1$ and $X_2$, then the predicted $X_1$ computed from (14) can be compared to the actual value of $X_1$ by taking the difference $$D_1 = X_1 - (mX_2 + b) \quad (15)$$

Under normal operating conditions, $D_1$, called the regression-based difference, will be Gaussian with mean zero and some fixed standard deviation. As one of the sensors begins to fail or degrade, the mean will begin to change. A change in the mean of this regression-based difference can be detected using the SPRT methodology.

The SPRT approach is a log-likelihood ratio based test for simple or composite hypothesis (also see the incorporated patents cited hereinbefore). To test for a change in the mean of the regression-based difference signal $D_1, D_2, \ldots$, the following two hypotheses are constructed:

$H_0$: $D_1, D_2, \ldots$ have Gaussian distribution with mean $M_0$ and variance $\sigma^2$
$H_F$: $X_1, X_2, \ldots$ have Gaussian distribution with mean $M_F$ and variance $\sigma^2$ where $H_0$ refers to the probability distribution of the regression-based difference under no failure and $H_F$ refers to the probability distribution of the regression-based difference under system or process failure. The SPRT is implemented by taking the logarithm of the likelihood ratio between $H_0$ and $H_F$. In particular, let $f_0(d_i)$ represent the probability density function for $D_1, D_2, \ldots$ under $H_0$, and $f_1(d_i)$ represent the probability density function for $D_1, D_2, \ldots$ under $H_F$. Let $Z_i = \log[f_1(X_i)/f_0(X_i)]$ the log-likelihood ratio for this test. Then $$Z_i = \frac{M_O - M_F}{\sigma^2} D_i + \frac{M_F^2 - M_O^2}{2\sigma^2} \quad (16)$$

Defining the value $S_n$ to be the sum of the increments $Z_i$ up to time n where $S_n = \Sigma_{1 \leq i \leq n} Z_i$, then the SPRT algorithm can be specified by the following:

If $S_n \leq B$     terminate and decide $H_0$

If $B < S_n < A$     continue sampling

If $S_n \geq A$     terminate and decide $H_F$

The endpoints A and B are determined by the user specified error probabilities of the test. In particular, let $\alpha = P\{$ conclude $H_F | H_0$ true$\}$ be the type I error probability (false alarm probability) and $\beta = P\{$ conclude $H_0 | H_F$ true$\}$ be the type II error probability (missed alarm probability) for the SPRT. Then $$A = \log \frac{1-\beta}{\alpha} \quad (17)$$
$$B = \log \frac{\beta}{1-\alpha}$$

For real time applications, this test can be run repeatedly on the computed regression-based difference signal as the observations are collected so that every time the test concludes $H_0$, the sum $S_n$ is set to zero and the test repeated. On the other hand, if the test concludes $H_F$, then a failure alarm is sounded and either the SPRT is repeated or the process terminated.

An illustration of this preferred form of bivariate regression SPRT method can be based on the EBR-II nuclear reactor referenced hereinbefore. This reactor used redundant thermocouple sensors monitoring a subassembly outlet temperature, which is the temperature of coolant exiting fuel subassemblies in the core of the reactor. These sensors readings are highly correlated, but not identical. The method of this embodiment as applied to this example system was performed using two such temperature sensors; $X_1$=channel 74/subassembly outlet temperature 4E1, and $X_2$=channel 63/subassembly outlet temperature 1A1. For 24 minutes worth of data during normal operation on Jul. 7, 1993, a regression line is specified for $X_1$ as a function of $X_2$ according to equation (14). The predicted $X_1$ from (14) is then compared to the actual $X_1$ by taking the regression-based difference (15) in our new regression-SPRT algorithm. The results of this experiment are then compared to the results of performing a prior-art SPRT test on the difference X2–X1 according to U.S. Pat. No. 5,410,492.

Figure 6A:
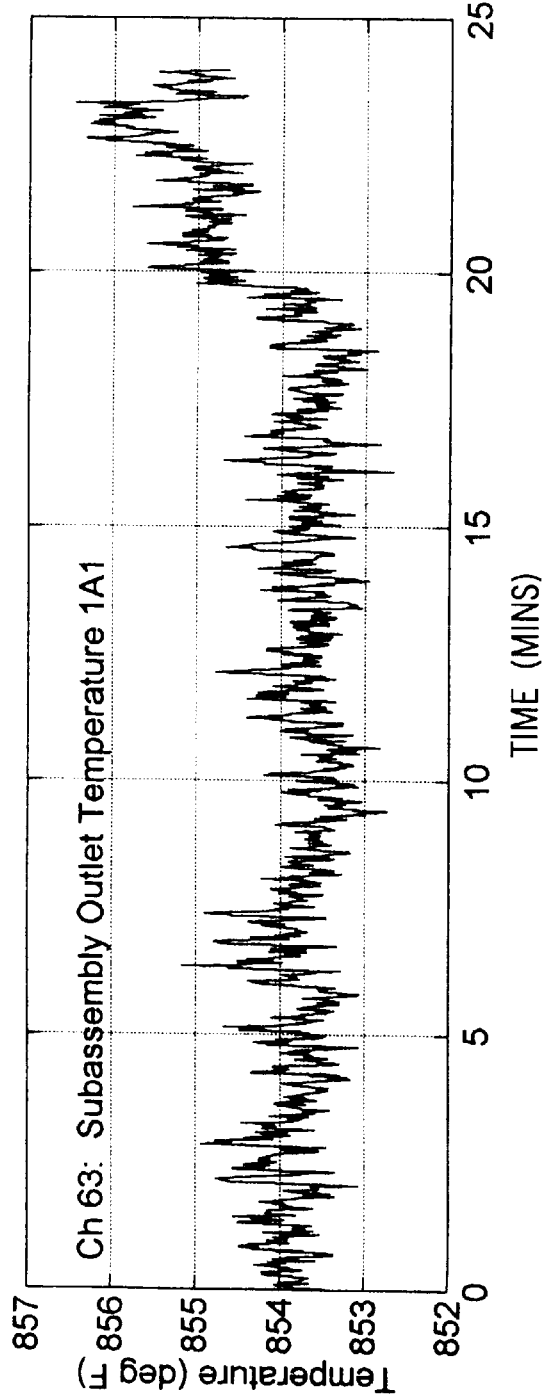
FIG. 6A illustrates EBR-II subassembly outlet temperature 1A1 under normal operating conditions.
Figure 6B:
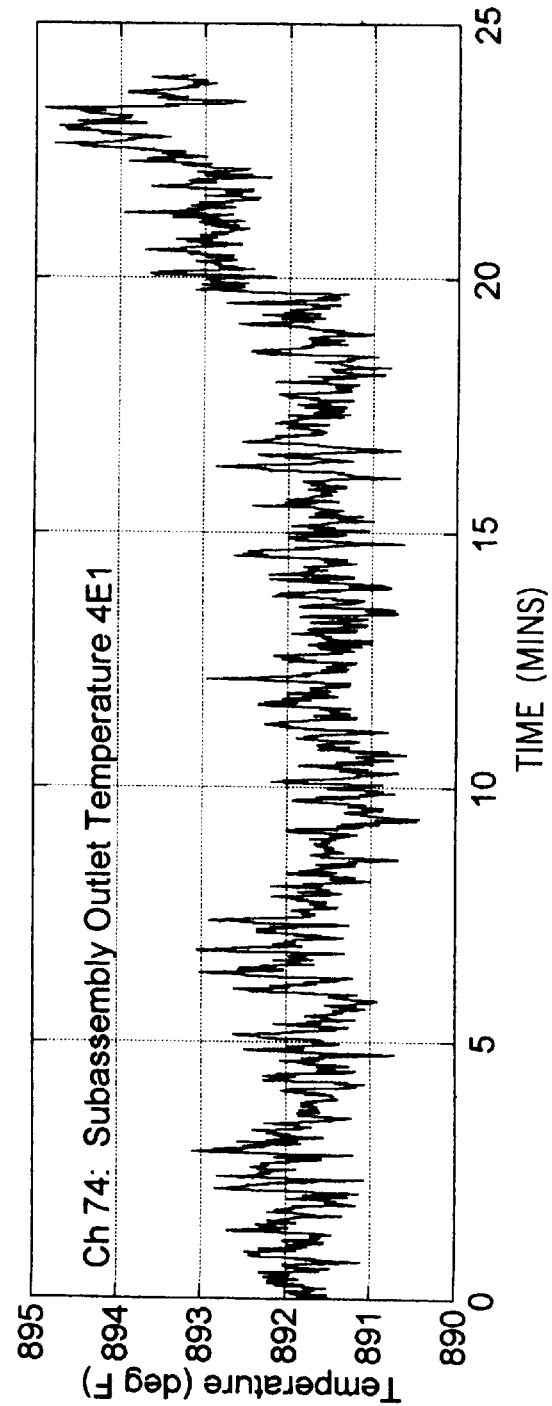
FIG. 6B shows EBR-II subassembly outlet temperature 4E1 under normal operating conditions.
Figure 7:
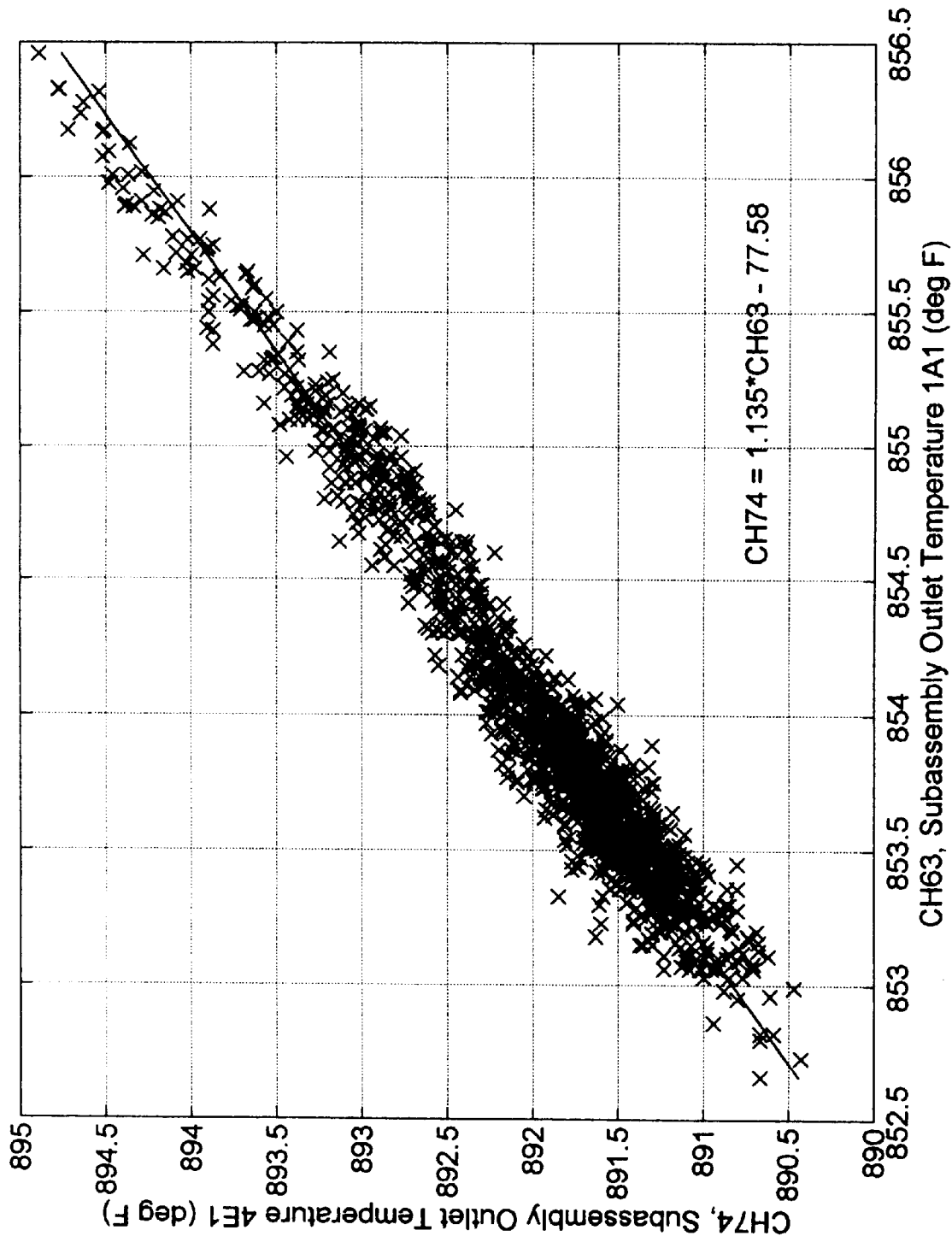
FIG. 7 illustrates the regression line relationship of the two variable data sets of FIGS. 6A and 6B.
Figure 8A:
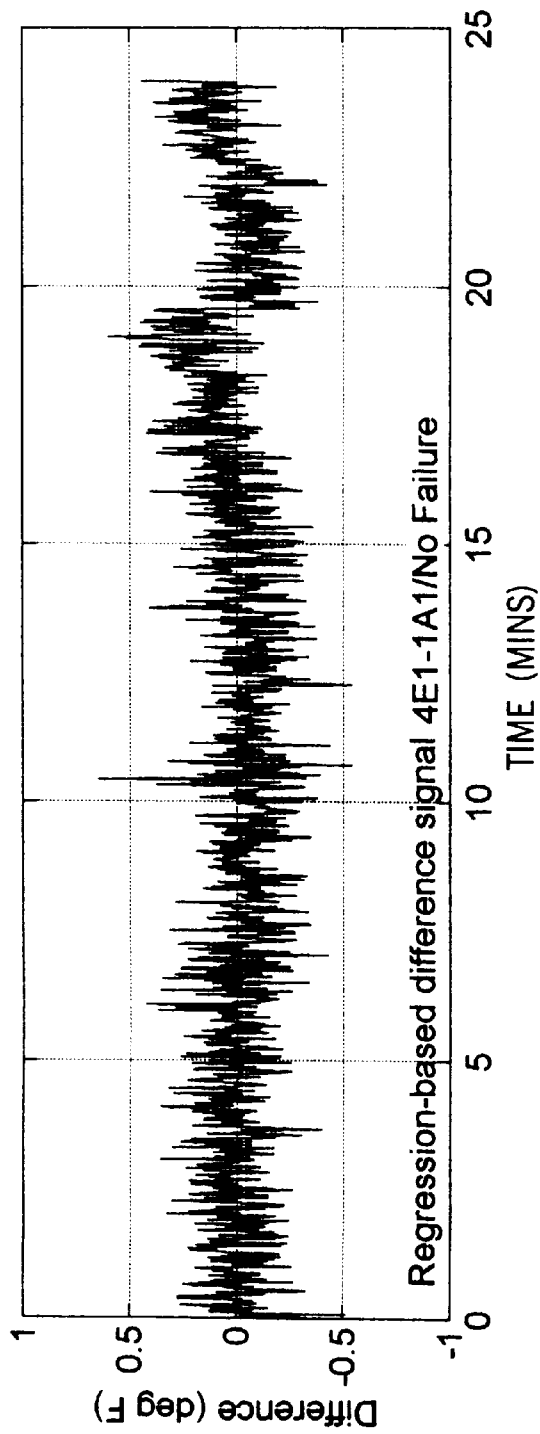
FIG. 8A illustrates a regression based difference signal for EBR-II subassembly outlet temperatures 4E1-1A1.
Figure 8B:
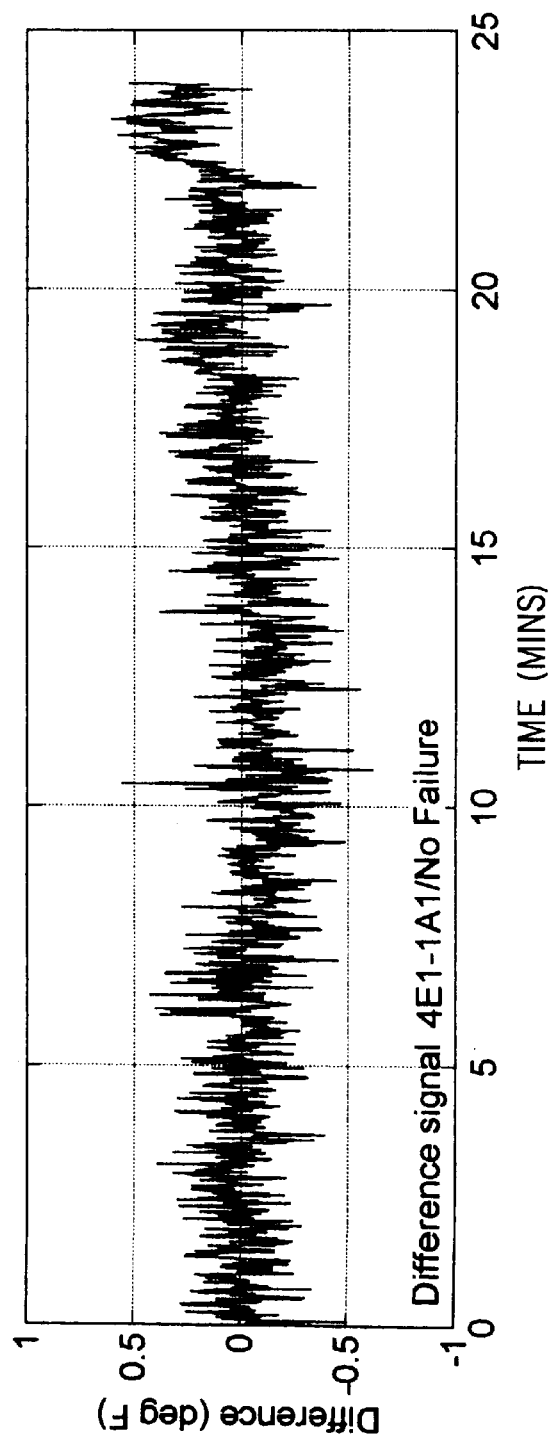
FIG. 8B shows a difference signal using the prior art method of U.S. Pat. No. 5,223,207.

Plots of subassembly outlet temperature 1A1 and 4E1 under normal operating conditions are given in FIG. 6A and 6B. The relationship between the two variables when no failure is present is illustrated in FIG. 7. In FIG. 7, the slope and intercept of the regression line from equation (14) are given. FIGS. 8A and 8B illustrate the regression-based difference signal along with the difference signal of the prior art proposed by U.S. Pat. No. 5,223,207. It is easy to see that the regression-based difference signal tends to remain closer to zero than the original difference signal under normal operating conditions. FIGS. 9A and 9B plot the results of a SPRT test on both the regression-based difference signal and the original difference signal. In both cases, the pre-specified false- and missed-alarm probabilities are set to 0.01, and the threshold for failure (alternate hypothesis mean) is set to 0.5° F. In both subplots, the circles indicate a failure decision made by the SPRT test. Note that under no failure or degradation modes, the new regression-based SPRT gives fewer false alarms than the original difference. The calculated false alarm probabilities are given in Table I for these comparative SPRT tests plotted in FIGS. 9A and 9B.

TALBE I

Empirical False Alarm Probability for the SPRT test to Detect Failure of an EBR-II Subassembly Outlet Temperature Sensor

|  | Original Difference | Regression-Based Difference |
| --- | --- | --- |
| False Alarm Probability | 0.025 | 0.0056 |

The empirical false alarm probability for the SPRT operated on the regression-based difference (see FIG. 9A) is significantly smaller than the for the SPRT performed on the original difference signal (see FIG. 9B), indicating that it will have a much lower false-alarm rate. Furthermore, the regression-based difference signal yields a false alarm probability that is significantly lower than the pre-specified false alarm probability, while the original difference function yields an unacceptably high false alarm probability.

Figure 10A:
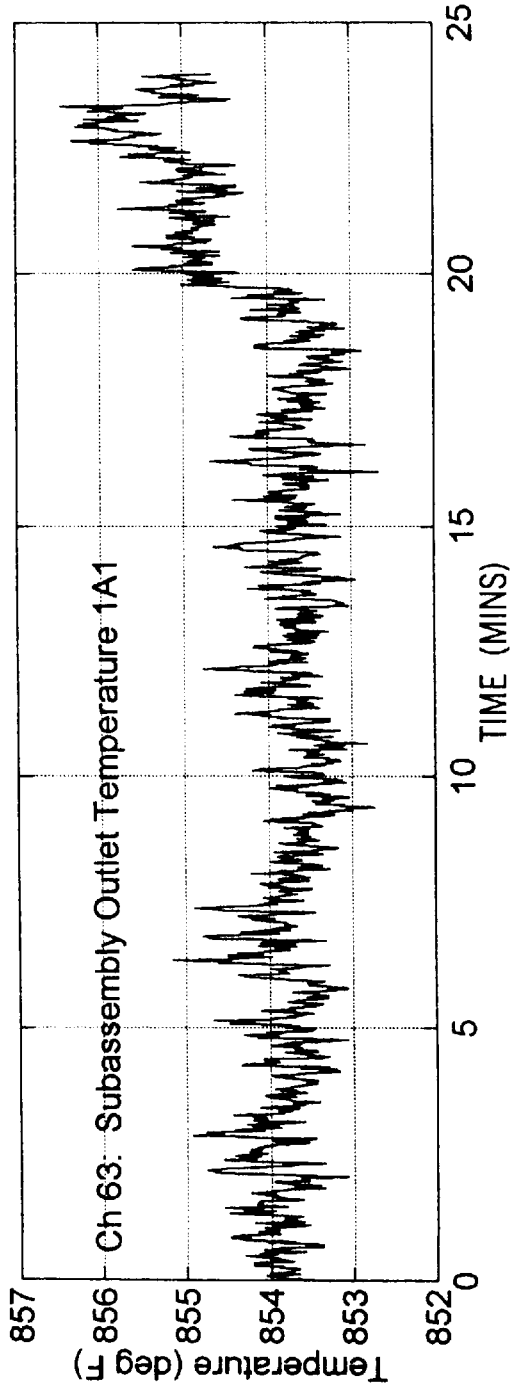
FIG. 10A illustrates the EBR-II signal of FIG. 6A (1A1) plus an added gradual signal trend.
Figure 10B:
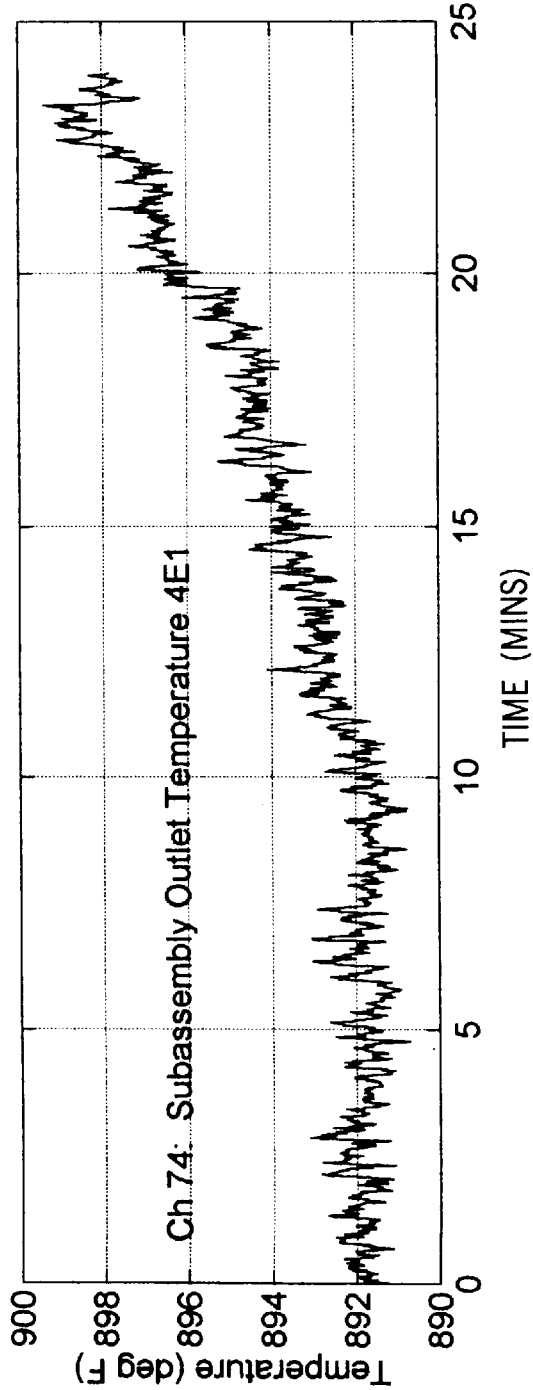
FIG. 10B shows the EBR-II signal of FIG. 6B (4E1) plus an added gradual signal trend.
Figure 11A:
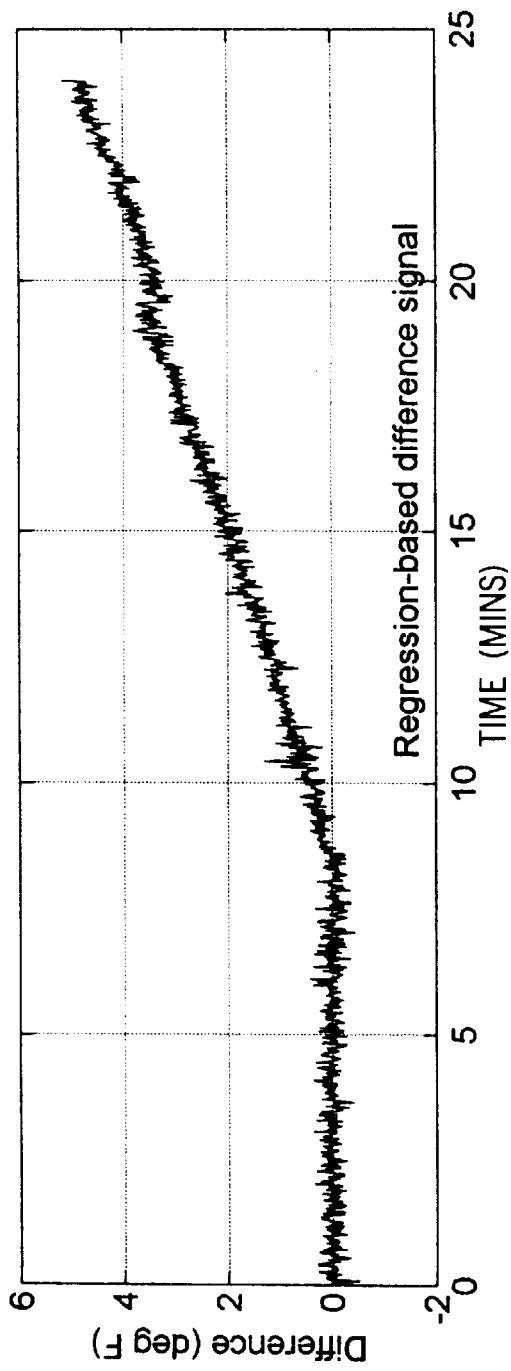
FIG. 11A illustrates a regression based difference signal for the data of FIG. 10A.
Figure 11B:
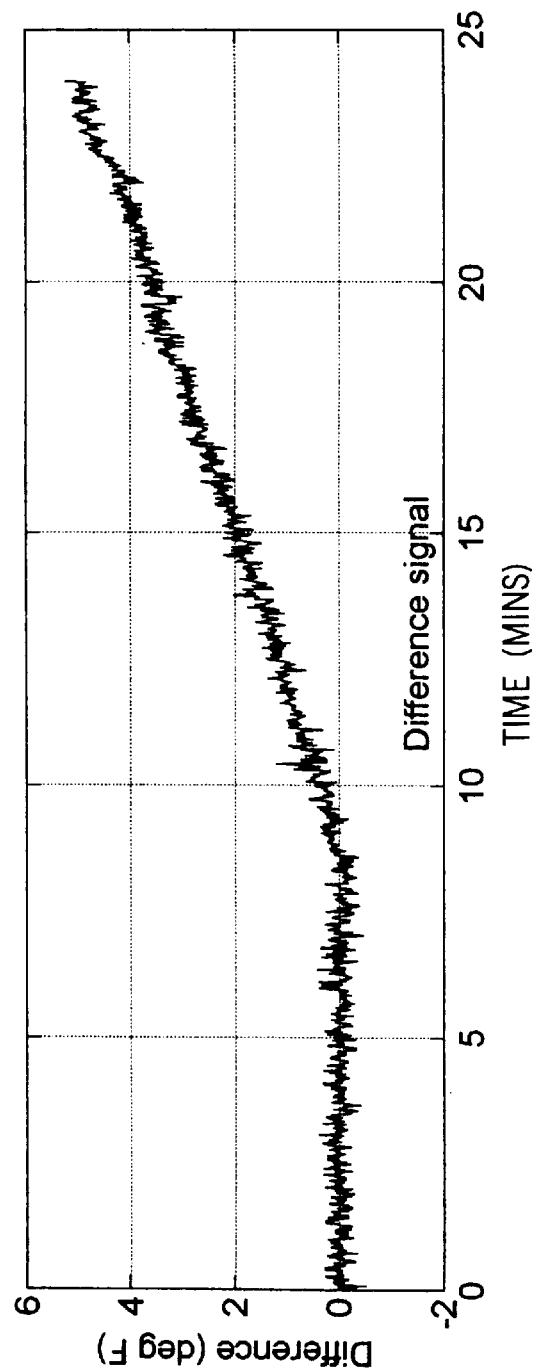
FIG. 11B shows a difference signal for the data of FIG. 10B.

To illustrate the performance of the regression-based difference method in a SPRT methodology under failure of one of the sensors, a gradual trend is added to the subassembly outlet temperatures 1A1. 4E1 to simulate the onset of a subtle decalibration bias in that sensor. The trend is started at 8 minutes, 20 seconds, and has a slope of 0.005° F. per second. These EBR-II signals with a failure injected are plotted in FIGS. 10A and 10B. The respective regression-based difference signal and the original difference signal are plotted in FIGS. 11A and 11B. FIGS. 12A and 12B respectively, plot the results of the SPRT test performed on the two difference signals. As before, the SPRT has false and missed alarm probabilities of 0.01, and a sensor failure magnitude of 0.5° F. In this case, the regression-based SPRT annunciated the onset of the disturbance even earlier than the conventional SPRT. The time of failure detection is given in Table II.

TABLE II

Time to Detection of Gradual Failure of EBR-II Subassembly Outlet Temperature

|  | Original Difference | Regression-Based Difference |
| --- | --- | --- |
| Time to Failure Detection | 9 min. 44 sec. | 9 min. 31 sec. |

These results indicate that the regression-based SPRT methodology yields results that are highly sensitive to small changes in the mean of the process. In this case, using the regression-based SPRT gave a failure detection 13 seconds before using the prior art method. A problem that is endemic to conventional signal surveillance methods is that as one seeks to improve the sensitivity of the method, the probability of false alarms increases. Similarly, if one seeks to decrease the probability of false alarms, one sacrifices sensitivity and can miss the onset of subtle degradation. The results shown here illustrate that the regression-based SPRT methodology for systems involving two sensors simultaneously improves both sensitivity and reliability (i.e. the avoidance of false alarms).

It is also within the scope of the preferred embodiments that the method can be applied to redundant variables whose functional relationship is nonlinear. An example of this methodology is also illustrated in FIG. 1 branching off the "sensors are linearly related" to the "monitor separately" decision box which can decide to do so by sending each signal to the MONOSPRT methodology or alternatively to the BART methodology described hereinafter.

In particular for a nonlinear relation, if the monitored processes $X_1$ and $X_2$ are related by the functional relationship $$X_1 = f(X_2) \tag{18}$$

where f( ) is some nonlinear function determined by physical laws (or other empirical information) between the variables, then the relationship (18) can be used to check for sensor or system failure. In this case, the relationship (18) can be specified by using nonlinear regression of $X_1$ on $X_2$. The predicted $X_1$ can then be compared to the actual $X_1$ via the regression-based SPRT test performed on the resulting nonlinear regression-based difference signal.

In another form of the invention shown in FIG. 1D in systems with more than two variables one can use a nonlinear multivariate regression technique that employs a bounded angle ratio test (hereinafter BART) in N Dimensional Space (known in vector calculus terminology as hyperspace) to model the relationships between all of the variables. This regression procedure results in a nonlinear synthesized estimate for each input observation vector based on the hyperspace regression model. The nonlinear multivariate regression technique is centered around the hyperspace BART operator that determines the element by element and vector to vector relationships of the variables and observation vectors given a set of system data that is recorded during a time period when everything is functioning correctly.

Figure 1D:
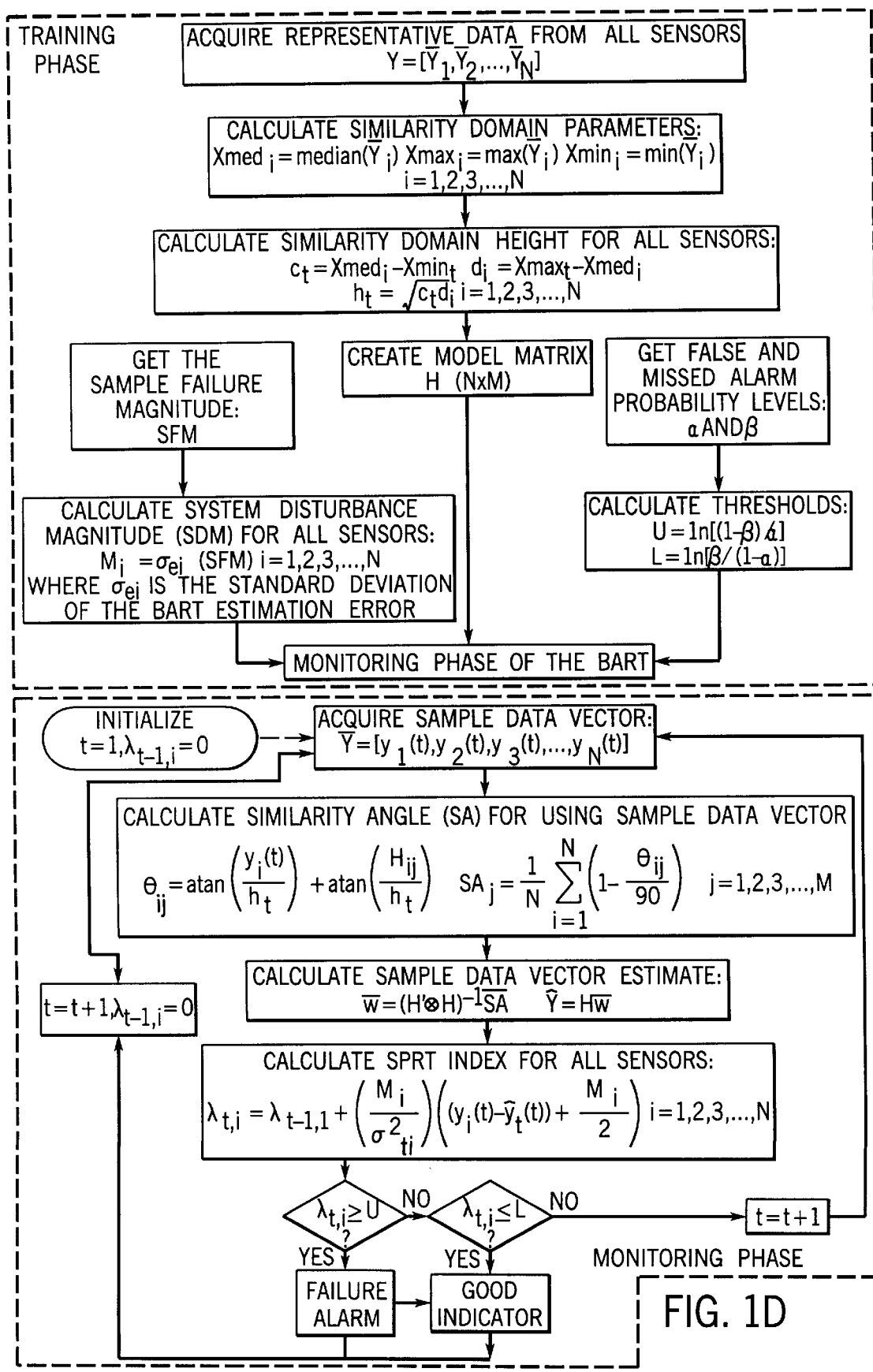
FIG. 1D illustrates a flow diagram of a BART method of data analysis.

In the BART method described in FIG. 1D., the method is also split into a training phase and a monitoring phase. The first step in the training phase is to acquire a data matrix continuing data samples from all of the sensors (or data sources) used for monitoring the system that are coincident in time and are representative of normal system operation. Then the BART parameters are calculated for each sensor (Xmed, Xmax and Xmin). Here Xmed is the median value of a sensor. The next step is to determine the similarity domain height for each sensor (h) using the BART parameters Xmed, Xmax and Xmin. Once these parameters are calculated a subset of the data matrix is selected to create a model matrix (H) that is used in the BART estimation calculations. Here, H is an N×M matrix where N is the number of sensors being monitored and M is the number of observations stored from each sensor. As was the case in both the MONOSPRT and regression SPRT method, the last steps taken during the training phase are the SPRT parameters calculations. The calculations are analogous to the calculations in the other methods, except that now the standard deviation value used to calculate SDI is obtained from BART estimation errors from each sensor (or data source) under normal operating conditions.

During the BART monitoring phase a sample vector is acquired at each time step t, that contains a reading from all of the sensors (or data sources) being used. Then the similarity angle (SA) between the sample vector and each sample vector stored in H is calculated. Next an estimate of the input sample vector Y is calculated using the BART estimation equations. The difference between the estimate and the actual sensor values is then used as input to the SPRT. Each difference is treated separately so that a decision can be made on each sensor independently. The decision logic is the same as is used in both MONOSPRT and the regression SPRT methods. This method is described in more detail immediately hereinafter.

In this embodiment of FIG. 1D of the invention, the method measures similarity between scalar values. BART uses the angle formed by the two points under comparison and a third reference point lying some distance perpendicular to the line formed by the two points under comparison. By using this geometric and trigonometric approach, BART is able to calculate the similarity of scalars with opposite signs.

In the most preferred form of BART an angle domain must be determined. The angle domain is a triangle whose tip is the reference point (R), and whose base is the similarity domain. The similarity domain consists of all scalars which can be compared with a valid measure of similarity returned. To introduce the similarity domain, two logical functional requirements can be established:

A) The similarity between the maximum and minimum values in the similarity domain is 0, and B) the similarity between equal values is 1.

Thus we see that the similarity range (i.e. all possible values for a measure of similarity), is the range 0 to 16) inclusive.

BART also requires some prior knowledge of the numbers to be compared for determination of the reference point (R). Unlike a ratio comparison of similarity, BART does not allow "factoring out" in the values to be compared. For example, with the BART methodology the similarity between 1 and 2 is not necessarily equal to the similarity between 2 and 4. Thus, the location of R is vital for good relative similarities to be obtained. R lies over the similarity domain at some distance h, perpendicular to the domain. The location on the similarity domain at which R occurs (Xmed) is related to the statistical distribution of the values to be compared. For most distributions, the median or mean is sufficient to generate good results. In or preferred embodiment the median is used since the median provides a good measure of data density, and is resistant to skewing caused by large ranges of data.

Figure 13:
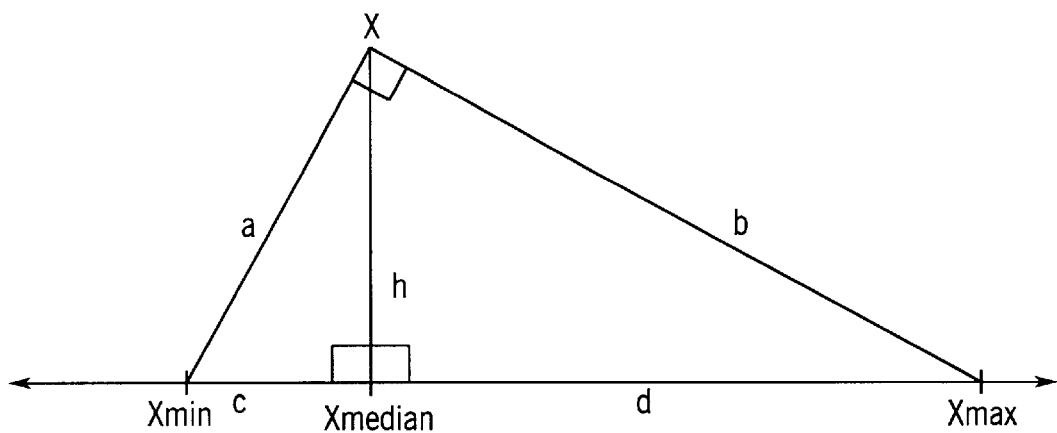
FIG. 13 illustrates conditions and values for carrying out a bounded angle ratio test.

Once Xmed has been determined, it is possible to calculate h. In calculating h, it is necessary to know the maximum and minimum values in the similarity domain. (Xmax and Xmin respectively) for normalization purposes the angle between Xmin and Xmax is defined to be 90°. The conditions and values defined so far are illustrated in FIG. 13. From this triangle it is possible to obtain a system of equations and solve for h as shown below:

$$c = Xmed - Xmin \qquad (19)$$
$$d = Xmax - Xmed$$
$$a^2 = c^2 + h^2$$
$$b^2 = d^2 + h^2$$
$$(c+d)^2 = a^2 + b^2$$
$$(c+d)^2 = c^2 + d^2 + 2h^2$$
$$h^2 = cd$$
$$h = \sqrt{cd}$$

Figure 14:
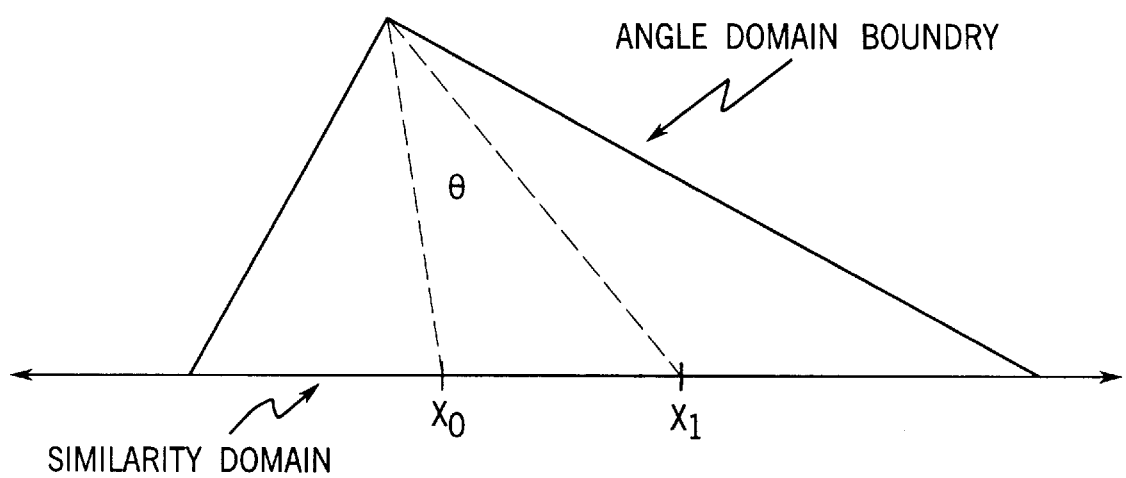
FIG. 14 illustrates conditions for comparing similarity of two points $X_0$ and $X_1$ on the diagram of FIG. 13.
Figure 15C:
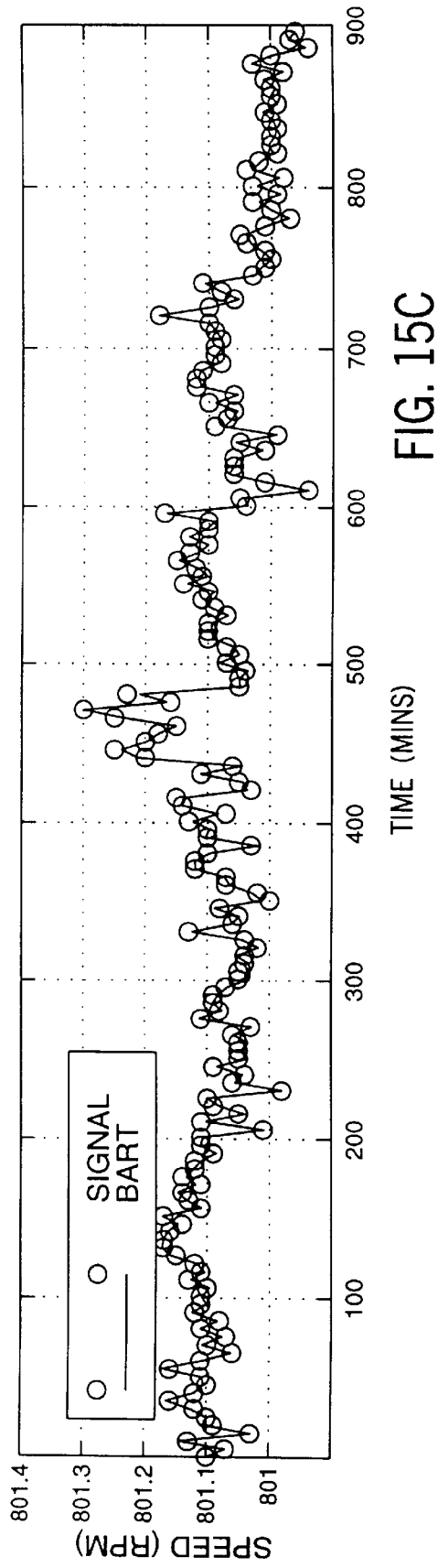
FIG. 15C shows EBR-II channel 3 primary pump 1 speed under normal conditions and modeled BART.
Figure 15D:
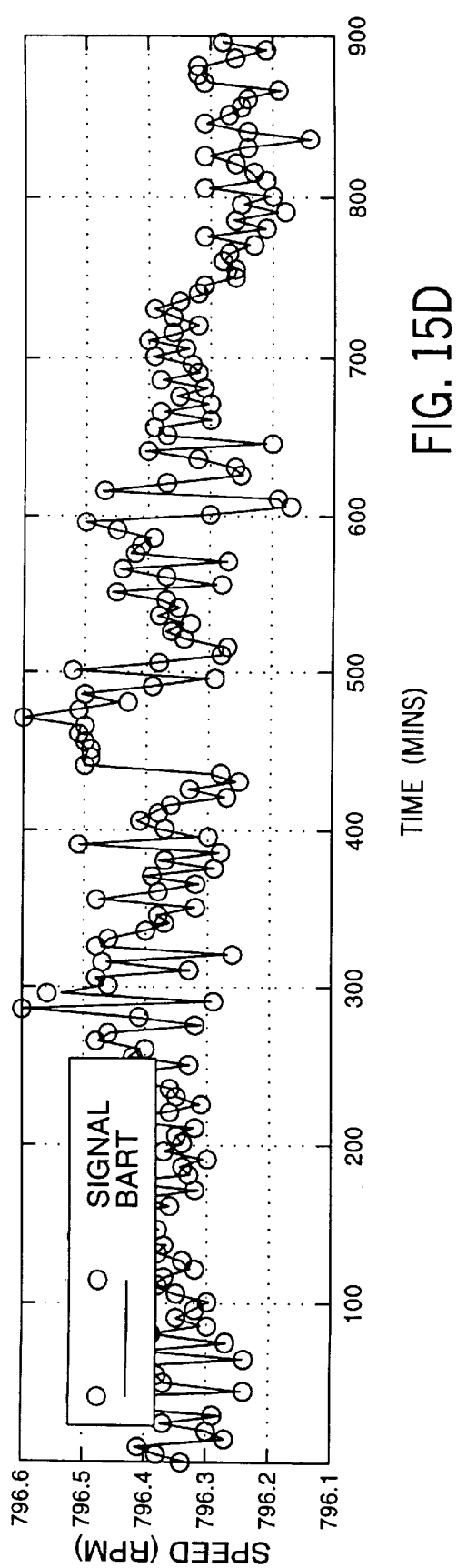
FIG. 15D shows channel 4 primary pump 2 speed under normal operation and modeled BART.
Figure 15E:
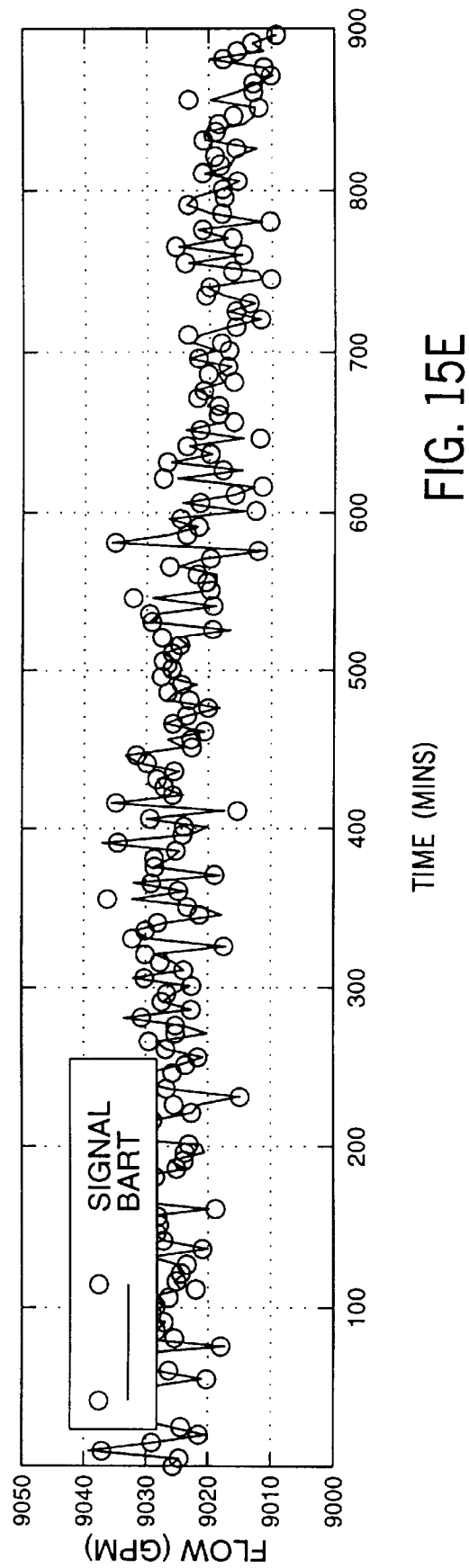
FIG. 15E shows channel 5 reactor outlet flow rate under normal conditions and modeled BART.
Figure 16A:
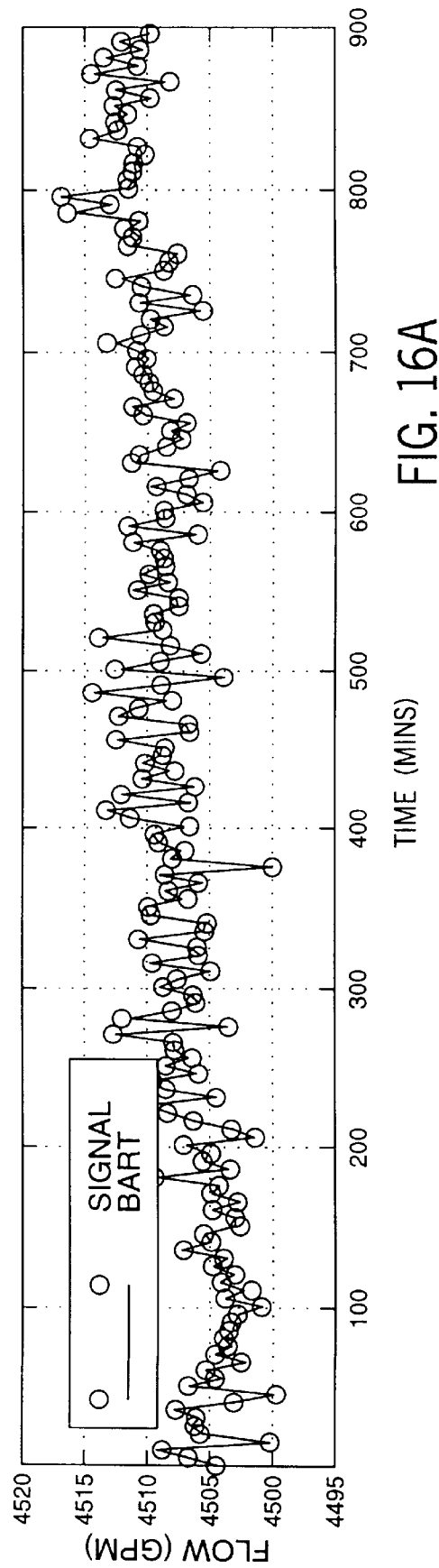
FIG. 16A shows EBR-II channel 6 primary pump 2 flow rate under normal conditions and modeled BART.
Figure 16B:
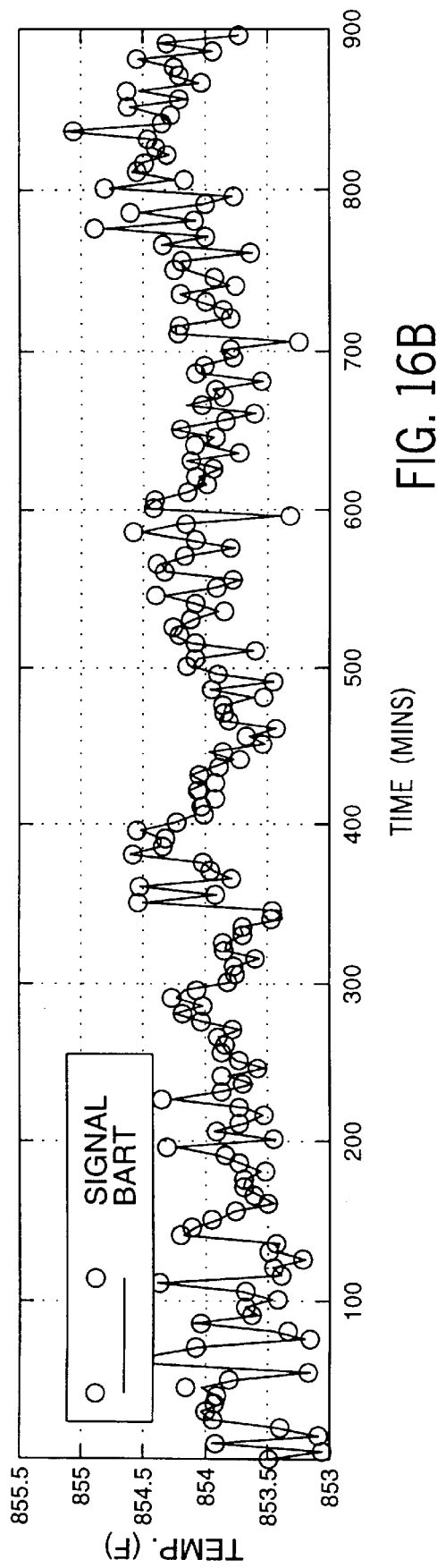
FIG. 16B shows EBR-II channel 7 subassembly outlet temperature 1A1 under normal conditions and modeled BART.
Figure 16C:
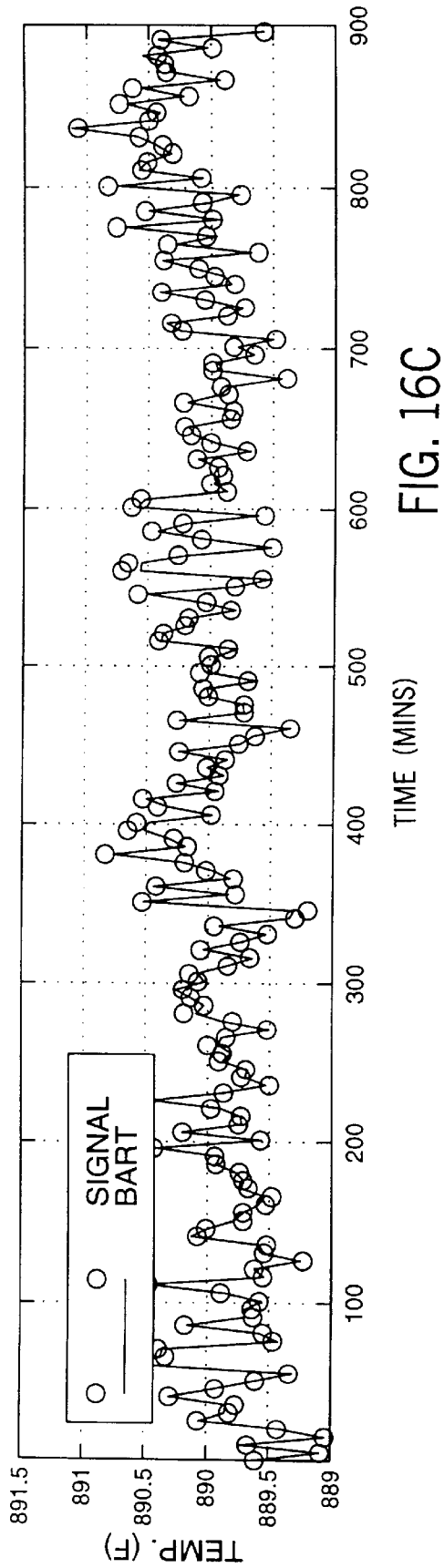
FIG. 16C illustrates channel 8 subassembly outlet temperature 2B1 under normal conditions and modeled BART.
Figure 16D:
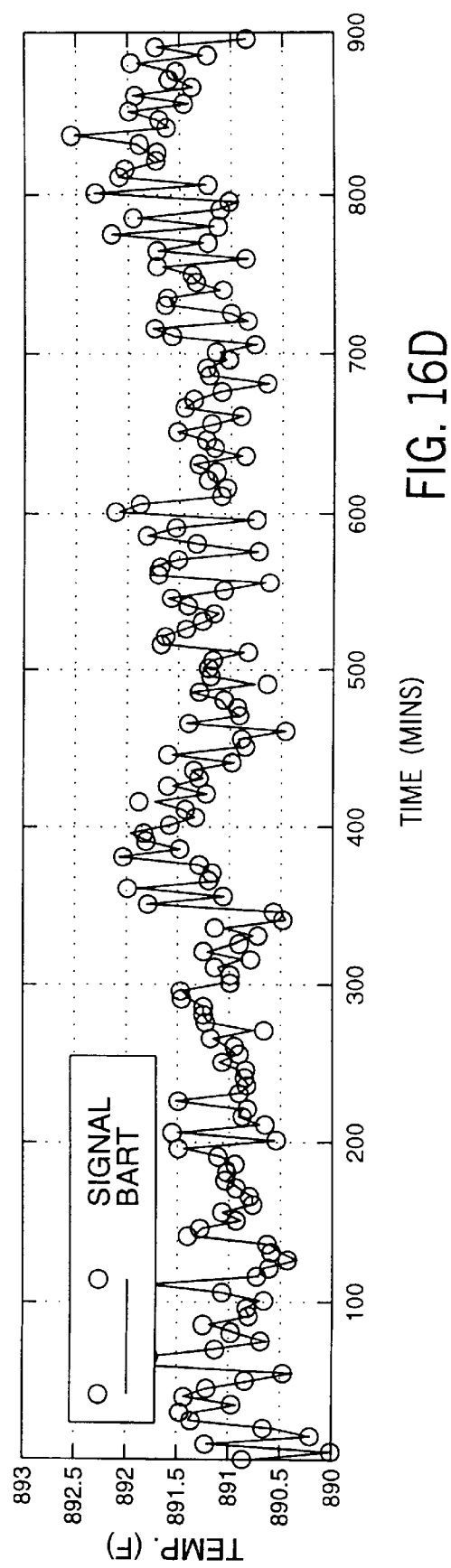
FIG. 16D illustrates channel 9 subassembly outlet temperature 4E1 under normal conditions.
Figure 16E:
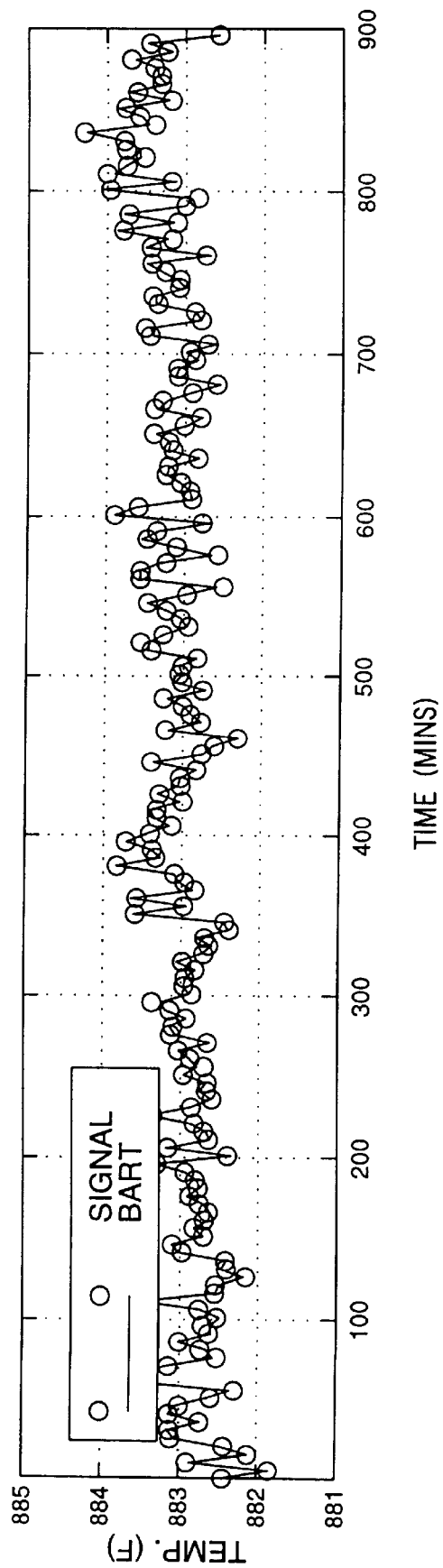
FIG. 16E illustrates channel 10 subassembly outlet temperature 4F1 under normal operation and modeled BART.

Once h has been calculated the system is ready to compute similarities. Assume that two points: $X_0$ and $X_1$ ($X_0 \leq X_1$) are given as depicted in FIG. 14 and the similarity between the two is to be measured. The first step in calculating similarity is normalizing $X_0$ and $X_1$ with respect to Xmed. This is done by taking the euclidean distance between Xmed and each of the points to be compared. Once $X_0$ and $X_1$ have been normalized, the angle $\angle X_0 R X_1$ (hereinafter designated $\theta$) is calculated by the formula:

$$\theta = \text{ArcTan}(X_1|h) = \text{ArcTan}(X_0|h) \qquad (20)$$

After $\theta$ has been found, it must be normalized so that a relative measure of similarity can be obtained that lies within the similarity range. To ensure compliance with functional requirements (A) and (B) made earlier in this section, the relative similarity angle (SA) is given by:

$$SA = 1 - \frac{\theta}{90°} \qquad (21)$$

Formula (21) satisfies both functional requirements established at the beginning of the section. The angle between Xmin and Xmax was defined to be 90°, so the similarity between Xmin and Xmax is 0. Also, the angle between equal values is 0°. The SA therefore will be confined to the interval between zero and one, as desired.

To measure similarity between two vectors using the BART methodology, the average of the element by element SAs are used. Given the vectors $x_1$ and $x_2$ the SA is found by first calculating $S_i$ for i=1,2,3 . . . n for each pair of elements in $x_1$ and $x_2$ i.e., if $x_1 = [X_{11} X_{12} X_{13} \ldots X_{1n}]$ and $x_2 = [X_{21} X_{22} X_{23} \ldots X_{2n}]$
The vector SA $\Gamma$ is found by averaging over the $S_i$'s and is given by the following equation.

$$\Gamma = \frac{1}{n} \sum_{i=1}^{n} S_i \qquad (22)$$

In general, when given a set of multivariate observation data from a process (or other source of signals), we could use linear regression to develop a process model that relates all of the variables in the process to one another. An assumption that must be made when using linear regression is that the cross-correlation information calculated from the process data is defined by a covariance matrix. When the cross-correlation between the process variables is nonlinear, or when the data are out of phase, the covariance matrix can give misleading results. The BART methodology is a nonlinear technique that measures similarity instead of the traditional cross-correlation between variables. One advantage of the BART method is that it is independent of the phase between process variables and does not require that relationships between variables be linear.

If we have a random observation vector y and a known set of process observation vectors from a process P, we can determine if y is a realistic observation from a process P by combining BART with regression to form a nonlinear regression method that looks at vector SAs as opposed to Euclidean distance. If the know observation vectors taken from P are given by, $$H = \begin{bmatrix} \begin{pmatrix} h_{11} \\ h_{21} \\ h_{31} \\ \vdots \\ h_{k1} \end{pmatrix} \begin{pmatrix} h_{12} \\ h_{22} \\ h_{32} \\ \vdots \\ h_{k2} \end{pmatrix} \cdots \begin{pmatrix} h_{1m} \\ h_{2m} \\ h_{3m} \\ \vdots \\ h_{km} \end{pmatrix} \end{bmatrix} \qquad (23)$$
$$= [\underline{h_1} \; \underline{h_2} \; \cdots \; \underline{h_m}]$$

where H is k by m (k being the number of variables and m the number of observations), then the closest realistic observation vector to y in process P given H is given by $$y = Hw \qquad (24)$$

Here w is a weighting vector that maps a linear combination of the observation vectors in H to the most similar representation of y. The weighting vector w is calculated by combining the standard least squares equation form with BART. Here, $\theta$ stands for the SA operation used in BART.

$$w = (H' \oplus H)^{-1} H' \oplus y \qquad (25)$$

An example of use of the BART methodology was completed by using 10 EBR-II sensor signals. The BART system was trained using a training data set containing 1440 observation vectors. Out of the 1440 observation vectors 129 were chosen to be used to construct a system model. The 129 vectors were also used to determine the height h of the angle domain boundary as well as the location of the BART reference point R for each of the sensors used in the experiment. To test the accuracy of the model 900 minutes of one minute data observation vectors under normal operating conditions were run through the BART system. The results of the BART system modeling accuracy are shown in FIGS. 15A–15E and FIGS. 16A–16E (BART modeled). The Mean Squared Errors for each of the sensor signals is shown in Table III.

TABLE III

BART System Modeling Estimation Mean Squared Errors for EBR-II Sensor Signals

| Sensor Channel | Sensor Description | MSE of Estimation Error | Normalized MSE (MSE/$\mu_3$) | Normalized MSE (MSE/$\sigma_3$) |
|---|---|---|---|---|
| 1. | Primary Pump #1 Power (KW) | 0.0000190 | 0.0000002 | 0.0002957 |
| 2. | Primary Pump #2 Power (KW) | 0.0000538 | 0.0000004 | 0.0004265 |
| 3. | Primary Pump #1 Speed (RPM) | 0.0000468 | 0.0000001 | 0.0005727 |
| 4. | Primary Pump #2 Speed (RPM) | 0.0000452 | 0.0000001 | 0.0004571 |
| 5. | Reactor Outlet Flowrate (GPM) | 8.6831039 | 0.0009670 | 0.1352974 |
| 6. | Primary Pump #2 Flowrate (GPM) | 0.0571358 | 0.0000127 | 0.0163304 |
| 7. | Subassembly Outlet Temperature 1A1 (F) | 0.0029000 | 0.0000034 | 0.0062368 |
| 8. | Subassembly Outlet Temperature 2B1 (F) | 0.0023966 | 0.0000027 | 0.0052941 |
| 9. | Subassembly Outlet Temperature 4E1 (F) | 0.0025957 | 0.0000029 | 0.0050805 |
| 10. | Subassembly Outlet Temperature 4F1 (F) | 0.0024624 | 0.0000028 | 0.0051358 |

Figure 17A:
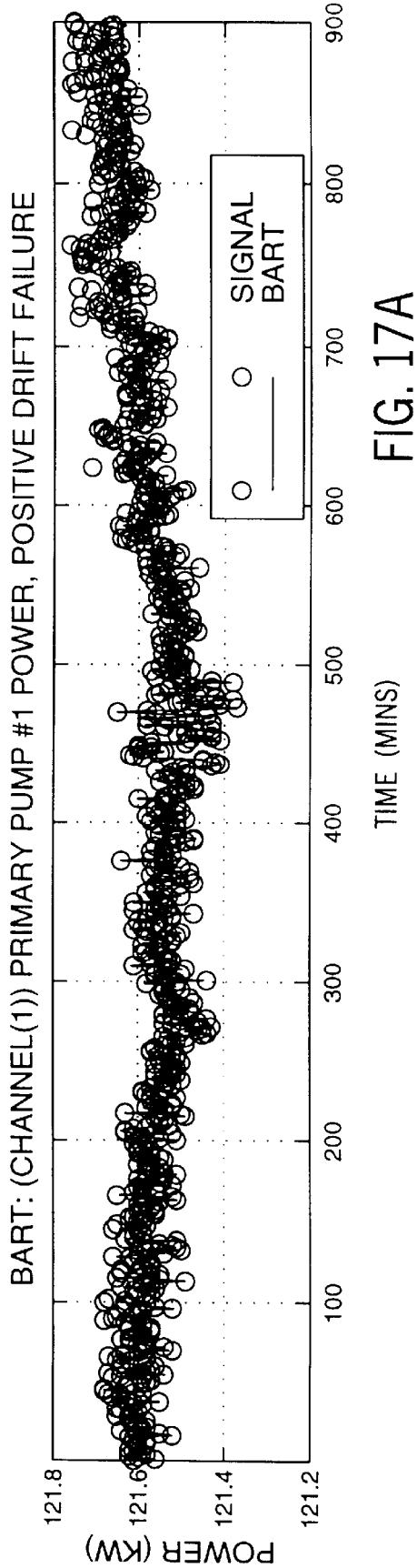
FIG. 17A shows an EBR-II primary pump power signal with an imposed positive drift.
Figure 17B:
FIG. 17B shows application of SPRT to the signal of FIG. 17A.
Figure 17E:
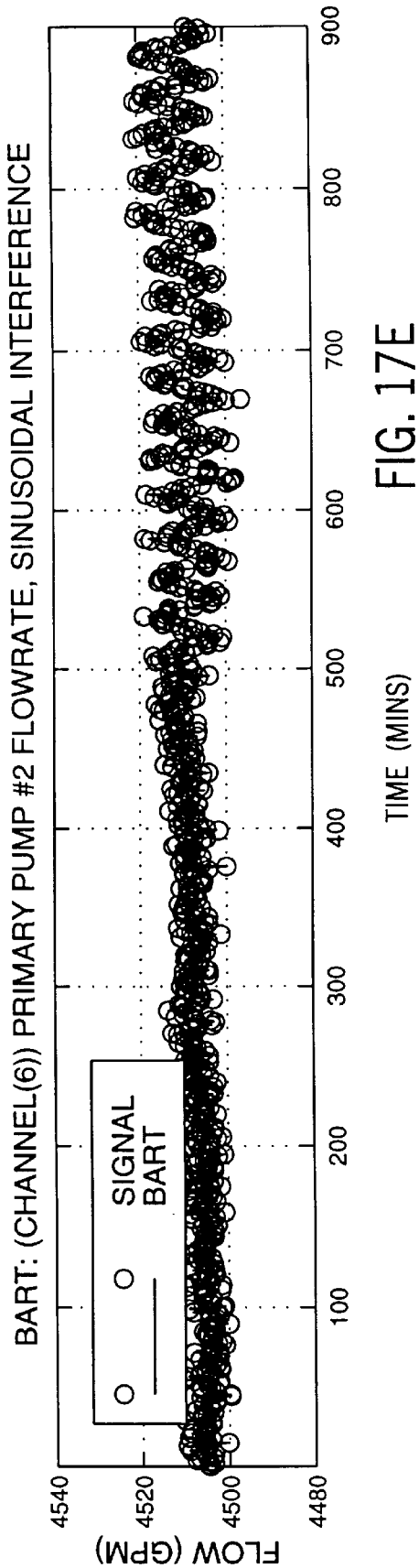
FIG. 17E shows an EBR-II primary pump power signal with an imposed sinusoidal disturbance.
Figure 17F:
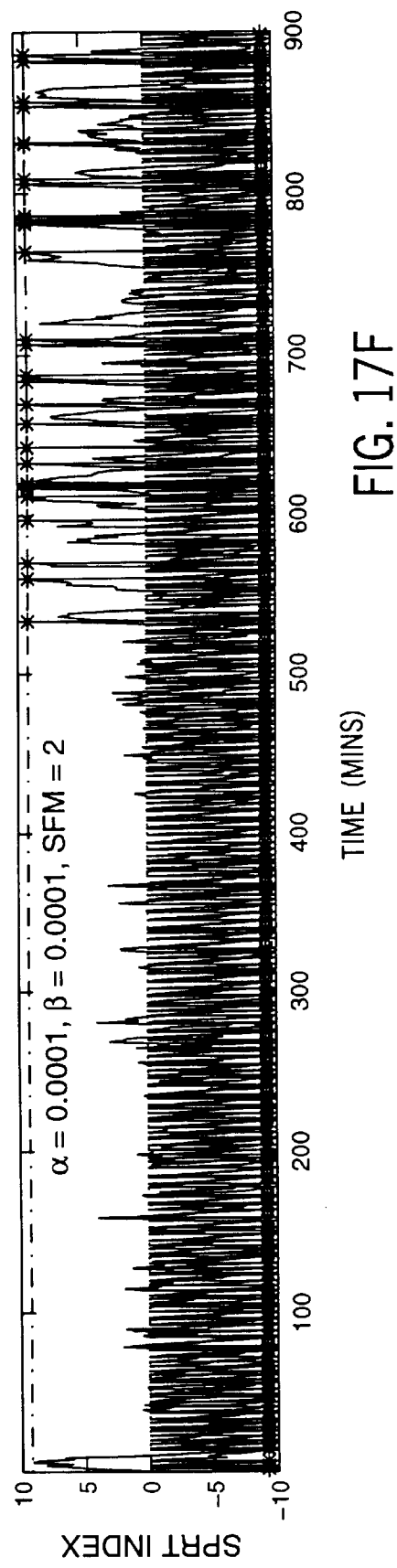
FIG. 17F shows application of SPRT to the signal of FIG. 17E.

A second example shows the results of applying BART to ten sensors signals with three different types of disturbances with their respective BART estimates superimposed followed by the SPRT results when applied to the estimation error signals. The first type of disturbance used in the experiment was a simulation of a linear draft in channel #1. The drift begins at minute 500 and continues through to the end of the signal, reaching a value of 0.21% of the sensor signal magnitude and the simulation is shown in FIG. 17A. The SPRT (FIG. 17B) detects the drift after it has reached a value of approximately 0.06% of the signal magnitude. In FIG. 17C a simulation of a step failure in channel #2 is shown. Here the step has a height of 0.26% of the signal magnitude and begins at minute 500 and continues throughout the signal. FIG. 17D shows the SPRT results for the step failure. The SPRT detects the failure immediately after it was introduced into the signal. The last simulation was that of a sinusoidal disturbance introduced into channel #6 as shown in FIG. 17E. The sinusoid starts at minute 500 and continues throughout the signal with a constant amplitude of 0.15% of the sensor signal magnitude. The SPRT results for this type of disturbance are shown in FIG. 17F. Again the SPRT detects the failure even though the sinusoid's amplitude is within the operating range of the channel #6 sensor signal.

In further variations on the above described embodiments a user can generate one or more estimated sensor signals for a system. This methodology can be useful if a sensor has been determined to be faulty and the estimated sensor signal can be substituted for a faulty, or even degrading, sensor or other source of data. This methodology can be particularly useful for a system having at least three sources of data, or sensors.

While preferred embodiments of the invention have been shown and described, it will be clear to those skilled in the art that various changes and modifications can be made without departing from the invention in its broader aspects as set forth in the claims provided hereinafter.

What is claimed is:

1. A method of monitoring a source of data for determining an operating condition of a system, comprising the steps of:

determining a sensor arrangement associated with monitoring a source of data for a system;

activating a first method for performing a sequential probability ratio testing procedure if the sensor arrangement includes a single sensor by inputting the data to a module for performing the sequential probability ratio testing;

activating a second method for performing a regression sequential probability ratio testing procedure if the sensor arrangement includes a pair of sensors with signals which are linearly related but not redundant by inputting the data to a module for performing the regression sequential probability ratio testing;

activating a third method for performing a bounded angle ratio test procedure if the sensor arrangement includes multiple sensors which have signals that are selected from the group consisting of non-linearly and linearly related signals relative to one another by inputting the data to a module for performing the bounded angle ratio test; and utilizing at least one of the first, second and third methods to accumulate sensor signals and determine the operating condition of the system.

2. The method as defined in claim 1 wherein a MONO-SPRT index is calculated in the first method.

3. The method as defined in claim 1 wherein a regression based difference is determined for each of the pair of sensors.

4. The method as defined in claim 1 wherein a similarity angle is calculated for each of the multiple sensor signals.

5. A method of monitoring a source of data for determining an operating condition of a system, comprising the steps of:

determining learned states of a normal operational condition of a system;

using the learned states of the normal operational condition as inputs to a first computer program module for generating expected values of the system by performing a bounded angle ratio test procedure for the system having at least three sensors which generate signals selected from the group consisting of a nonlinearly and linearly related signals, relative to one another; and inputting the expected values to a second computer program module for performing a sequential probability ratio test and upon detecting a deviation from a pattern characteristic of normal operation an alarm is generated which indicates a failure in an item selected from the group consisting of said system and one of said sensors.

6. The method as defined in claim 5 wherein a similarity angle is calculated for each of the at least three sensors.

7. The method as defined in claim 5 wherein the signals from the at least three sensors are being processed in substantially real time.

8. The method as defined in claim 5 wherein the signals from the at least three sensors are derived at least in part from off-line accumulated data.

9. A method monitoring a source of data for determining an operating condition of a system, comprising the steps of:

determining learned states of a normal operational condition of a system;

using the learned states of the normal operational condition as inputs to a first computer program module for generating expected values of the system by performing a bounded angle ratio test procedure for the system having at least three sensors which generate signals selected from the group consisting of a nonlinearly and linearly related signals, relative to one another;

inputting the expected values to a second computer program module for performing a sequential probability ratio test and upon detecting a deviation from a pattern characteristic of normal operation of one of said sensors an alarm is generated when a failure of one of said sensors occurs;

identifying a faulted sensor in the system; and substituting the faulted sensor with an estimated signal.

10. The method as defined in claim 9 wherein a similarity angle is calculated for each of the at least three sensors.

11. The method as defined in claim 9 wherein the signals from the at least three sensors are being processed in substantially real time.

12. The method as defined in claim 9 wherein the signals from the at least three sensors are derived at least in part from off-line accumulated data.

* * * * *

UNITED STATES PATENT AND TRADEMARK OFFICE
CERTIFICATE OF CORRECTION

PATENT NO. : 5,987,399
DATED : November 16, 1999
INVENTOR(S) : Wegerich et al.

It is certified that error appears in the above-indentified patent and that said Letters Patent is hereby corrected as shown below:

In col. 6, line 39, change "indexes to in" to -- indexes in --.

In col. 7, line 12, change "m>p" to -- $m \geq p$ --.

In col. 7, line 24, change "$\tilde{Y}$ is $\tilde{O}$ where $\tilde{O}$ is" to -- $\{\tilde{Y}\}_{jt}$ is $\tilde{O}_p$ where $\tilde{O}_p$ is --.

In col. 8, eqn. 7, delete "$\mu_{H_S}$" and "$\mu_{h_S}$".

In col. 8, eqn. 8, change "$(\bar{y}')_j$" to -- $\bar{y}'_i$ --.

In col. 8, eqn. 11, substitute in its entirety as follows:
-- $\overline{M} = [1\,1\,1\ldots1]\sigma'_0 k$ --.

In col. 12, line 4, change "sensors" to -- sensor --.

In col. 12, line 16, change "X2-X1" to -- $X_2$-$X_1$ --.

In col. 12, line 19, change "FIG." to -- FIGS. --.

UNITED STATES PATENT AND TRADEMARK OFFICE
CERTIFICATE OF CORRECTION

PATENT NO. : 5,987,399
DATED : November 16, 1999
INVENTOR(S) : Wegerich et al

It is certified that error appears in the above-indentified patent and that said Letters Patent is hereby corrected as shown below:

In col. 12, line 39, change "TALBE" to -- TABLE --.

In col. 12, line 60 change "1A1. 4E1 to" to -- 1A1 to --.

In col. 14, line 54, change "16) inclusive." to -- 16 inclusive. --.

In col. 15, line 1, change "In or preferred" to -- In a preferred --.

In col. 15, line 64, change "if $x_1=$" to -- if $\underline{x_1} =$ --.

In col. 15, line 64, change "and $x_2=$" to -- and $\underline{x_2} =$ --.

In col. 15, line 66, change "vector SAΓ" to -- vector SA$\underline{\Gamma}$ --.

UNITED STATES PATENT AND TRADEMARK OFFICE
CERTIFICATE OF CORRECTION

PATENT NO.   : 5,987,399
DATED        : November 16, 1999
INVENTOR(S)  : Wegerich et al It is certified that error appears in the above-indentified patent and that said Letters Patent is hereby corrected as shown below:

In col. 15, equation 20, change "=" in the second instance to - - - - - (minus sign).

Signed and Sealed this

Third Day of April, 2001

Attest:

NICHOLAS P. GODICI

*Attesting Officer*   Acting Director of the United States Patent and Trademark Office